United States Patent [19]
Kuroda et al.

[11] Patent Number: 5,732,161
[45] Date of Patent: Mar. 24, 1998

[54] IMAGE SYNTHESIZING APPARATUS FOR SYNTHESIZING AN IMAGE OF AN ORIGINAL AND PRINT DATA INPUT FROM AN EXTERNAL APPARATUS

[75] Inventors: Ken Kuroda, Yokohama; Yoshihiko Suzuki, Tokyo; Hideto Kohtani, Yokohama; Satoru Kutsuwada; Shokyo Koh, both of Kawasaki; Masahiro Iwadate, Yokohama, all of Japan

[73] Assignee: Canon Kabushiki Kaisha, Tokyo, Japan

[21] Appl. No.: 755,887

[22] Filed: Dec. 2, 1996

Related U.S. Application Data

[63] Continuation of Ser. No. 277,588, Jul. 20, 1994, abandoned.

[30] Foreign Application Priority Data

Jul. 23, 1993 [JP] Japan ................... 5-202607

[51] Int. Cl.$^6$ .................. G06K 9/36; H04N 1/387
[52] U.S. Cl. ........................ 382/284; 358/450
[58] Field of Search ...................... 382/284; 358/440, 358/450, 452, 468, 470; H04N 1/387

[56] References Cited

U.S. PATENT DOCUMENTS

| | | | |
|---|---|---|---|
| 4,542,378 | 9/1985 | Suganuma et al. | 340/734 |
| 4,631,597 | 12/1986 | Ogawa | 358/258 |
| 4,750,212 | 6/1988 | Yokomizo | 385/56 |
| 4,811,111 | 3/1989 | Kurokawa | 358/257 |
| 4,884,104 | 11/1989 | Yoshida | 355/202 |
| 4,897,734 | 1/1990 | Sato et al. | 358/448 |
| 5,021,876 | 6/1991 | Kurita et al. | 358/75 |
| 5,032,928 | 7/1991 | Sakai et al. | 358/448 |
| 5,038,218 | 8/1991 | Matsumoto | 358/296 |
| 5,187,593 | 2/1993 | Kurita et al. | 358/434 |
| 5,204,759 | 4/1993 | Sakai et al. | 358/444 |
| 5,396,345 | 3/1995 | Motoyama | 358/448 |

FOREIGN PATENT DOCUMENTS

| | | | |
|---|---|---|---|
| 0450663 | 5/1901 | European Pat. Off. | H04N 1/32 |
| 0290963 | 11/1988 | European Pat. Off. | H04N 1/32 |
| 0450663 | 10/1991 | European Pat. Off. | H04H 1/32 |

*Primary Examiner*—Andrew Johns
*Attorney, Agent, or Firm*—Fitzpatrick, Cella, Harper & Scinto

[57] ABSTRACT

An image synthesizing apparatus includes a reading unit which reads an image of an original, and an input unit which inputs print data from an external apparatus. A first setting unit sets a synthesis mode for synthesizing image data output from the reading unit and the print data input from the input unit for recordation, and a second setting unit sets a number of pages of different print data to be synthesized in the synthesis mode. A control unit is adapted, when the synthesis mode is set by the first setting unit, to maintain the synthesis mode until the different print data of the number of pages set by the second setting unit is input by the input unit, and to cancel the synthesis mode after the different print data of the set number of pages has been input.

23 Claims, 23 Drawing Sheets

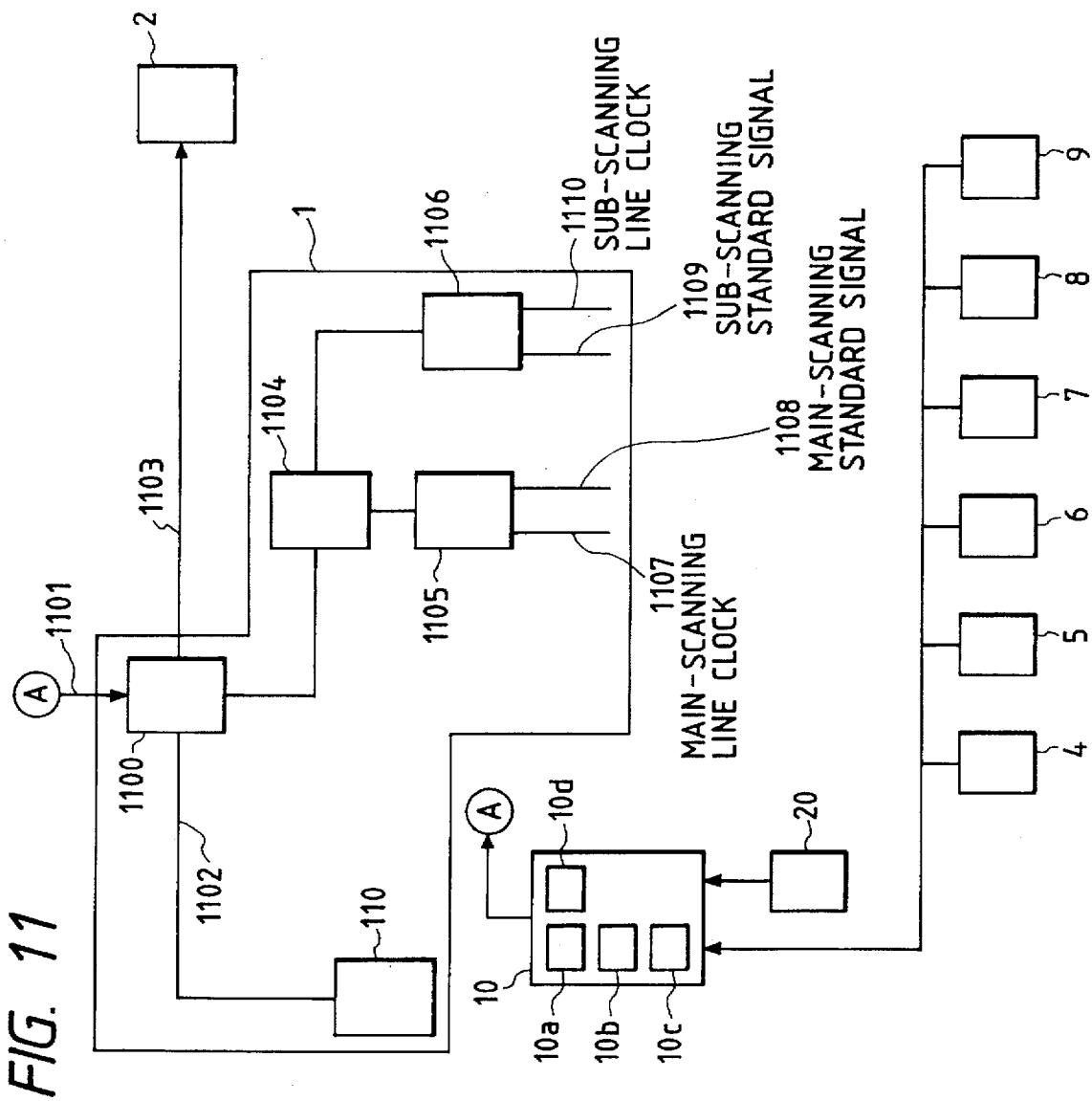

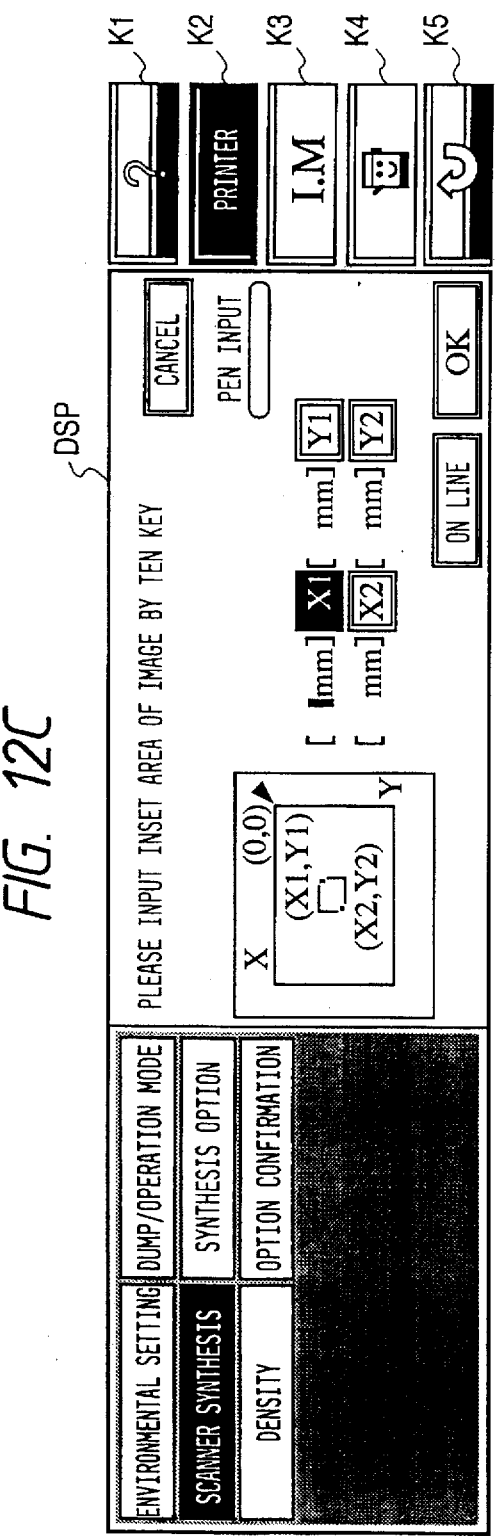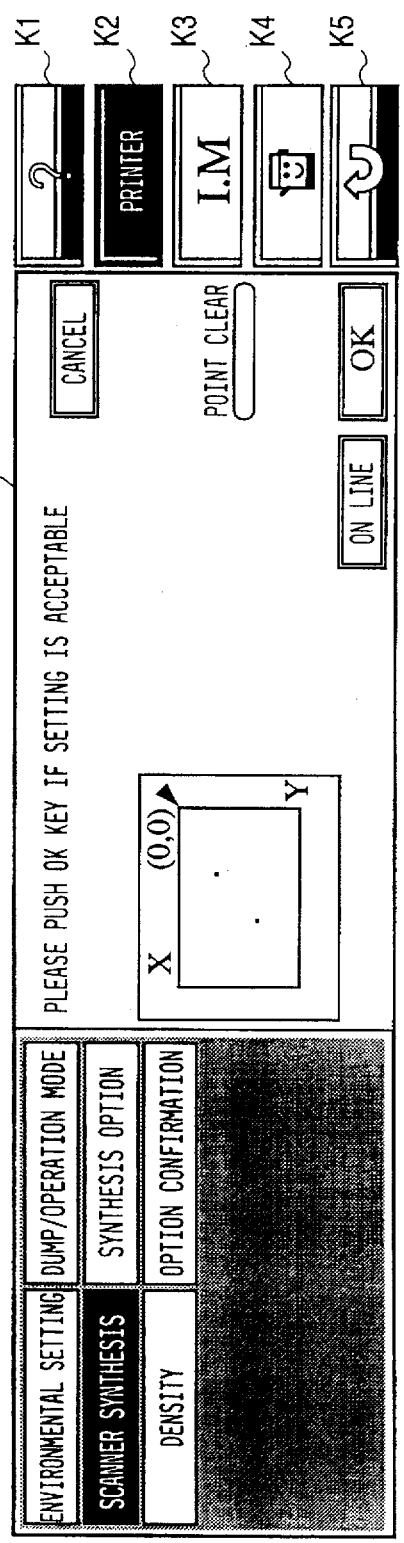

FIG. 13C

K1 K2 K3 K4 K5
(?) PRINTER I.M [icon] [arrow]

DSP

ENVIRONMENTAL SETTING | DUMP/OPERATION MODE
SCANNER SYNTHESIS | SYNTHESIS OPTION
DENSITY | OPTION CONFIRMATION

PLEASE INPUT NUMBER OF PAGES OF PRINT DATA BY TEN KEY.
[ 1 PAGE](1~999 PAGES)

CANCEL

CONSECUTIVE

ON LINE    OK

FIG. 13D

K1 K2 K3 K4 K5
(?) PRINTER I.M [icon] [arrow]

DSP

ENVIRONMENTAL SETTING | DUMP/OPERATION MODE
SCANNER SYNTHESIS | SYNTHESIS OPTION
DENSITY | OPTION CONFIRMATION

PRINT IMPOSSIBLE

AUTO
SHEET FEEDING SELECTION
ERROR SKIP

OFF LINE
PRINTER RESET
TEST PRINT

ON LINE
DISCHARGE
OVERLAY OUTPUT

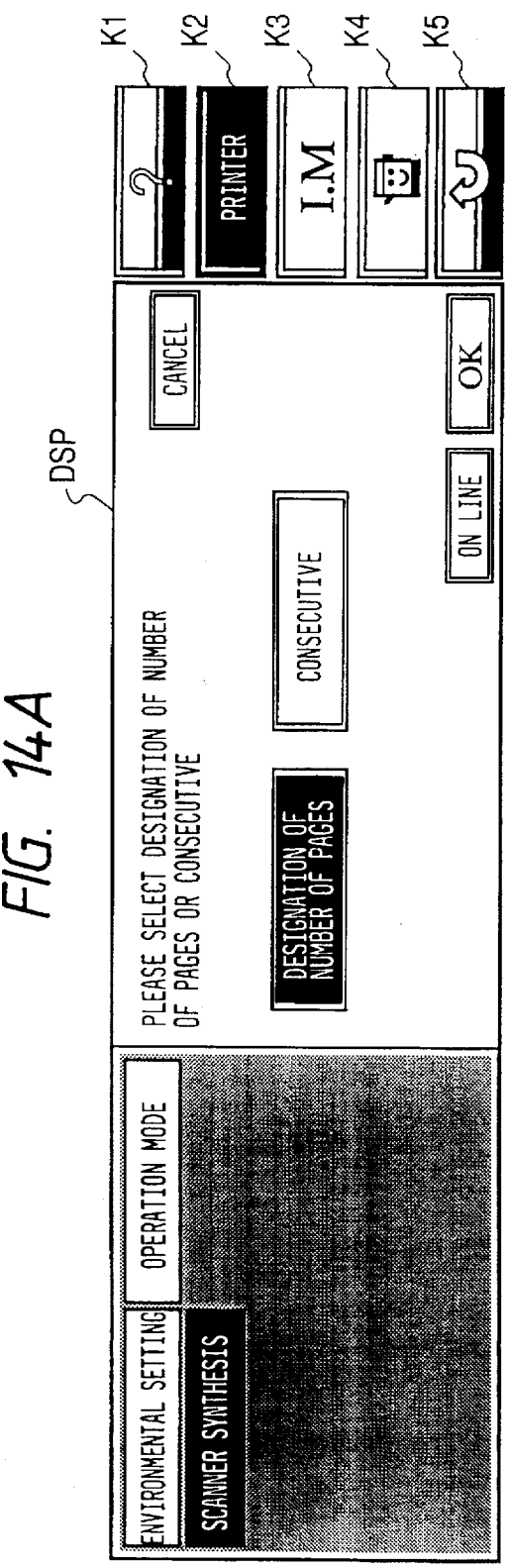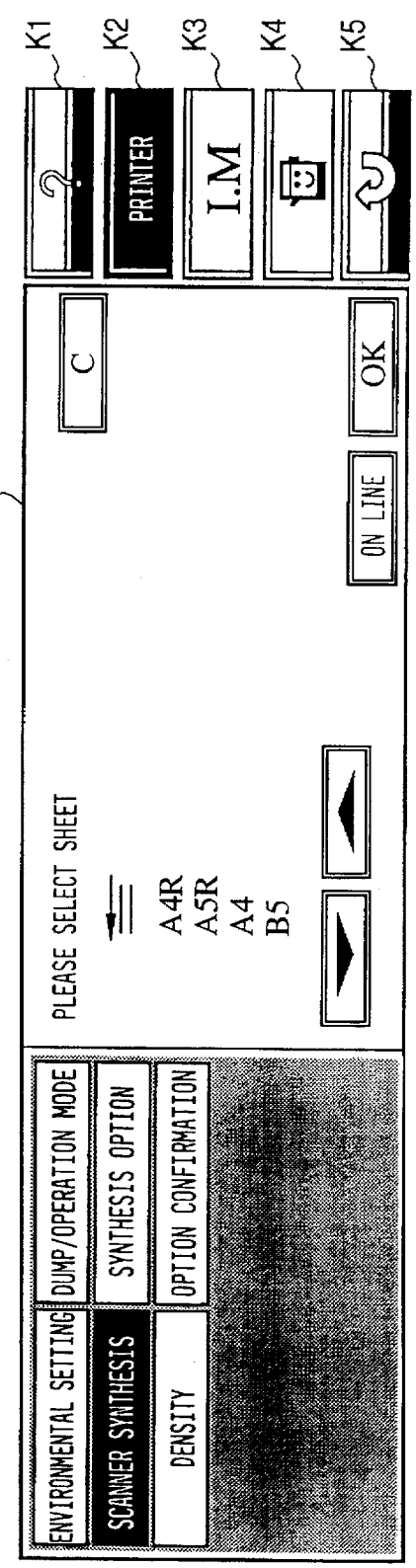

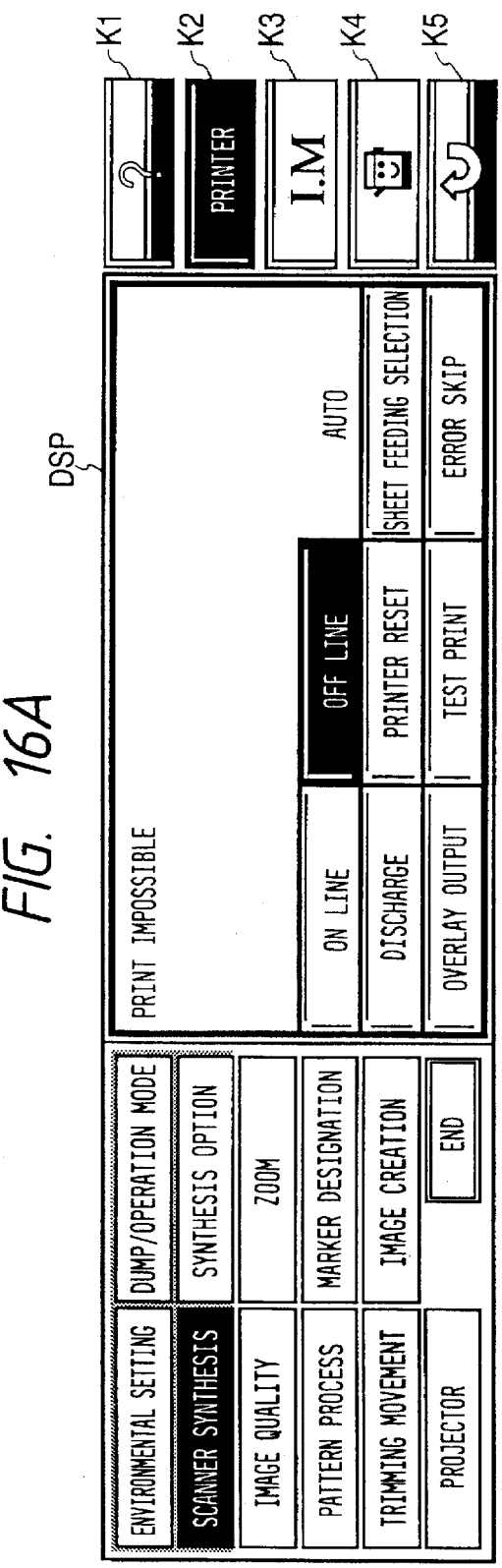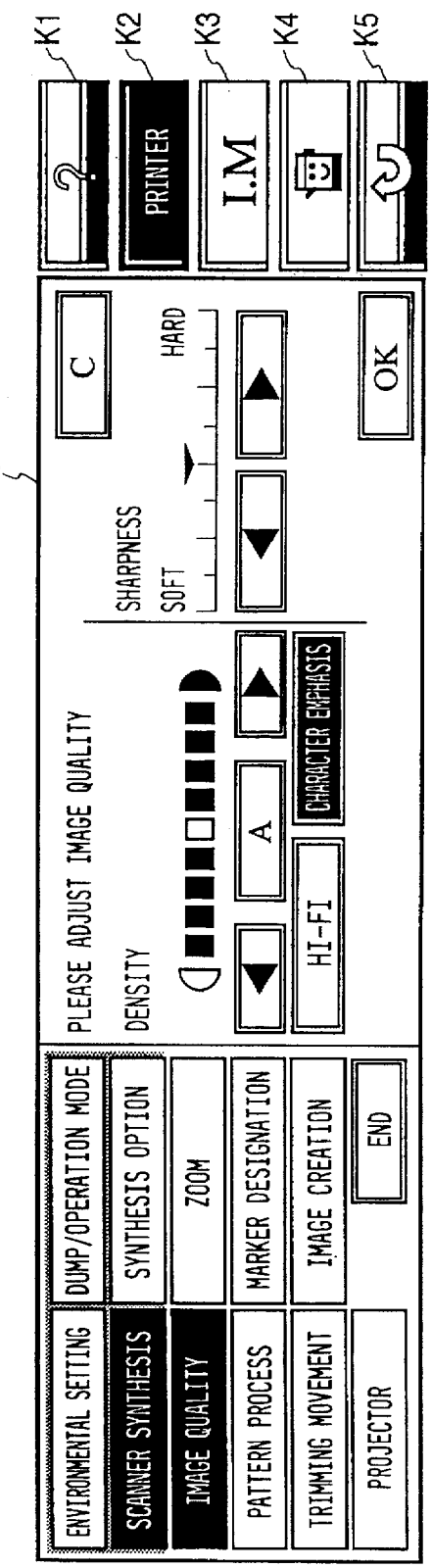
FIG. 16A
FIG. 16B

IMAGE SYNTHESIZING APPARATUS FOR SYNTHESIZING AN IMAGE OF AN ORIGINAL AND PRINT DATA INPUT FROM AN EXTERNAL APPARATUS

This application is a continuation of application Ser. No. 08/277,588 filed Jul. 20, 1994, now abandoned.

BACKGROUND OF THE INVENTION

1. Field of the Invention

The present invention relates to an image synthesizing apparatus for synthesizing an original image and an externally entered image.

2. Related Background Art

There has conventionally been proposed a multifunctional image processing apparatus consisting of a digital copying apparatus equipped with a scanner unit and a printer unit and of an external device such as a computer.

Such apparatus is provided with a memory for storing image data, for the purpose of synthesizing an original image with an externally entered (input) image, and the image synthesis is conducted in such memory.

However, when the image synthesizing mode is selected, there result various problems unless the conditions for releasing (cancelling) the image synthesizing mode are suitably selected.

For example, in case of synthesizing an image read from the scanner with an image and a character released (output) from the computer, the image scanned in the scanner is exclusively used for synthesis with the image from the computer when the image synthesizing mode is selected. Consequently the scanner unit cannot be utilized for other functions such as copying or facsimile transmission, and is exclusively occupied by the specified function, so that the utilization of the apparatus for other functions is limited.

For releasing the scanner unit from the occupied state for image synthesis, the operator is required to intentionally effect a cancelling operation for the image synthesis mode, so that the burden for the operator becomes greater.

SUMMARY OF THE INVENTION

The invention is directed to an image synthesizing apparatus which includes a reading unit which reads an image of an original, and an input unit which inputs print data from an external apparatus. Also included are a first setting unit which sets a synthesis mode for synthesizing image data output from the reading unit and the print data input from the input unit for recordations and a second setting unit which sets a number of pages of different print data to be synthesized in the synthesis mode. Further included is a control unit which is adapted, when the synthesis mode is set by the first setting unit, to maintain the synthesis mode until the different print data of the number of pages set by the second setting unit is input by the input means, and to cancel the synthesis mode after the different print data of the set number of pages has been input.

An object of the present invention is to provide an image synthesizing apparatus not associated with the above-mentioned drawbacks.

Another object of the present invention is to provide an image synthesizing apparatus capable of designating the number of pages of the images to be synthesized, and automatically cancelling the synthesizing mode after the synthesis of the designated number of pages, thereby improving the operability.

Still another object of the present invention is to provide an image synthesizing apparatus capable of automatically cancelling the synthesizing mode in case the information to be synthesized is not released from the computer, thereby enabling operations in other functions and reducing the wasted inoperable time.

Still other objects of the present invention, and the features thereof, will become fully apparent from the following description, to be taken in conjunction with the attached drawings and from the appended claims.

BRIEF DESCRIPTION OF THE DRAWINGS

FIG. 11 is a block diagram showing an example of an external switching circuit in the multifunctional image processing apparatus;

FIGS. 12A to 14B are views showing transitions of operation image frame in a scanner synthesis mode;

FIGS. 16A and 16B are views showing an example of the image frame for image quality setting as an option of the scanner synthesis;

FIGS. 18A to 19B are views showing examples of the image frame for image trimming/movement setting as an option of the scanner synthesis.

DETAILED DESCRIPTION OF THE PREFERRED EMBODIMENTS

Figure 1:
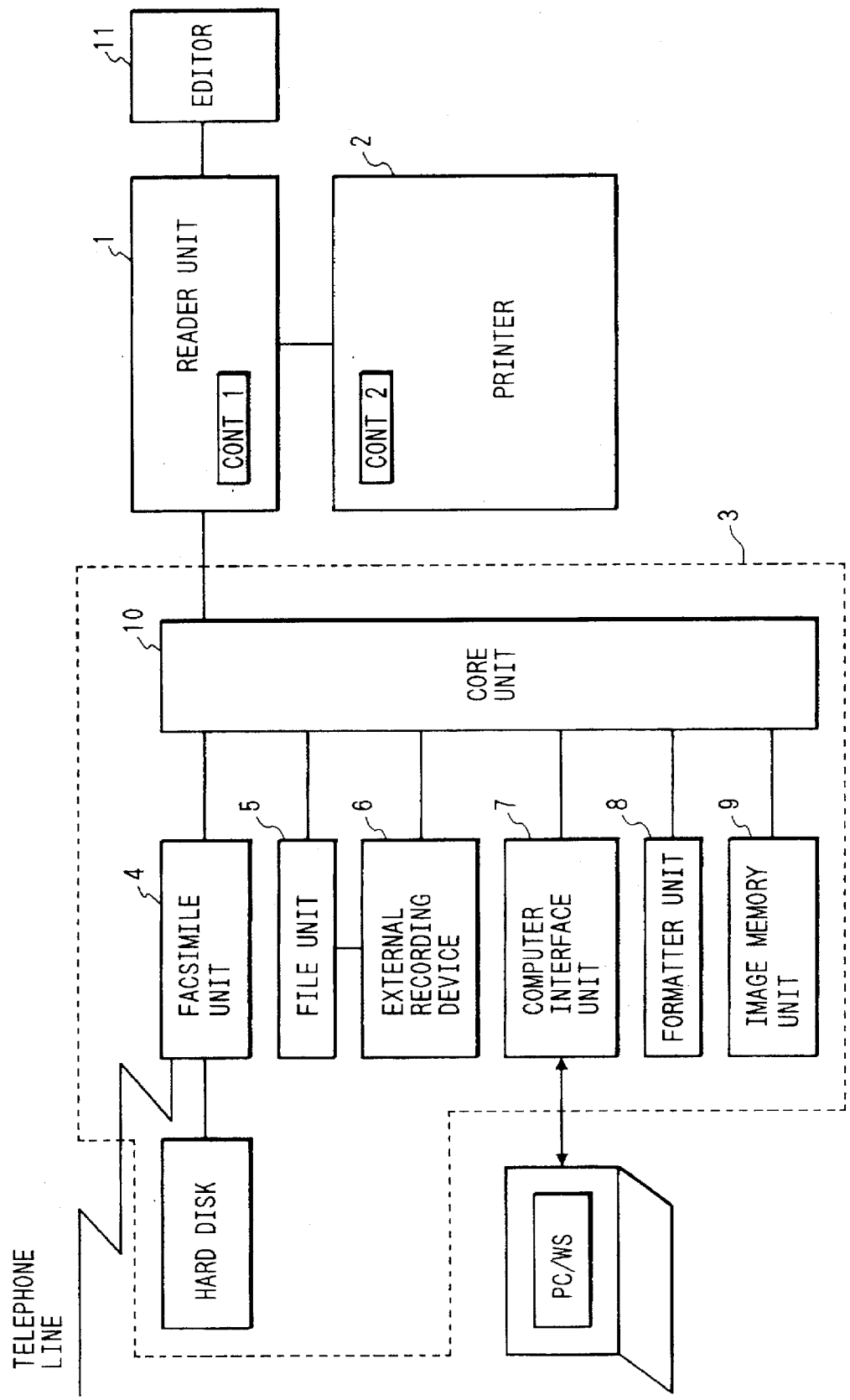
FIG. 1 is a block diagram showing the configuration of a multifunctional image processing apparatus in which the present invention is applicable.

FIG. 1 is a block diagram showing the configuration of a multifunctional image processing apparatus in which the present invention is applicable.

In FIG. 1, there are provided an image input device (reader unit) 1 for reading an original and converting the image thereof into image data; an image output device (printer unit) 2 containing plural recording sheet cassettes and adapted, in response to a printing command, to release the image data as a visible image on a recording sheet; and an external device 3 electrically connected with said reader unit 1 and adapted to effect various functions. More specifically, the external device 3 is provided with a facsimile unit 4, a file unit 5, an external memory device 6 connected to the file unit 5, a computer interface unit 7 for connection with a computer and a LAN, a formatter unit 9 for converting information from the computer into image information, an image memory unit 9 for storing the information from the reader unit 1 and temporarily storing the information transmitted from the computer, and a core unit 10 for controlling the functions of the above-mentioned units. There are also provided a reader control unit CONT1 and a printer control unit CONT2, capable of communication with the core unit 10 of the external device 3 and respectively provided with a CPU, a ROM, a RAM etc. Furthermore, an editor 11 is connected to the reader unit 1, and is used for area designation etc.

Figure 2:
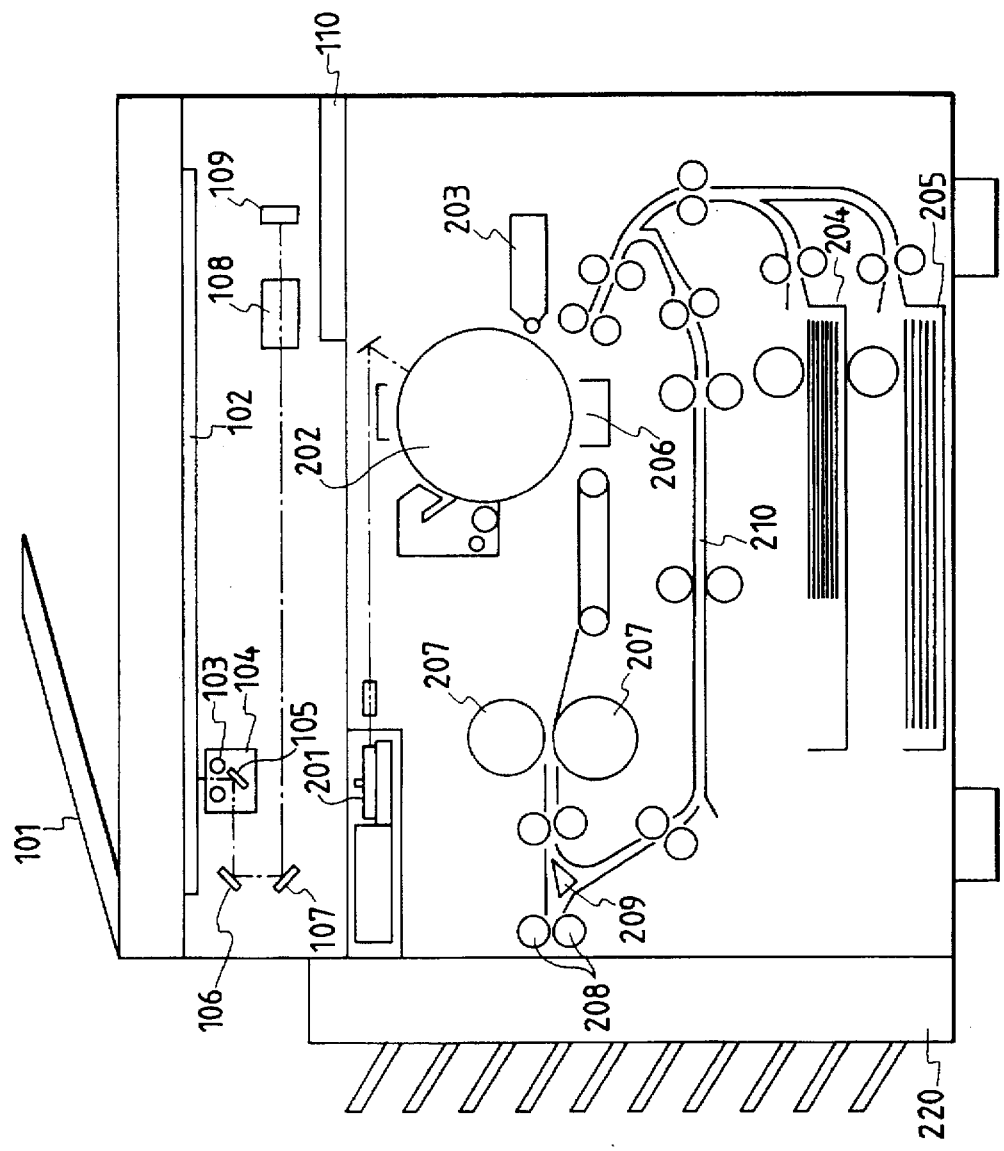
FIG. 2 is a cross-sectional view showing the configuration of a reader unit and a printer unit shown in FIG. 1.

FIG. 2 is a cross-sectional view showing the configuration of the reader unit 1 and the printer unit 2 shown in FIG. 1, and the structure and function of these units will be described in the following.

Originals stacked on an original feeder 101 are transported, one by one, onto an original supporting glass 102. When the original reaches an exposure position on the original supporting glass 102, a lamp 103 is turned on in the scanner unit, and a scanner unit 104 is moved to illuminate the original. The light reflected from the original is guided through mirrors 105, 106, 107 and a lens 108 and is focused on a CCD image sensor 109.

The light reflected from the original and focused on the CCD 109 is subjected to photoelectric conversion therein, and the electrical signal released therefrom is subjected, in an image processing unit 110, to various image processings. The image processing unit 110 is provided with a selector guiding thus processed image signal either to the printer unit 2 or to the external device 3. The selector also serves to select either the signal from the reader unit 1 or the signal from the external device 3 for supply to the printer unit 2.

The electrical signal supplied from the selector of the image processing unit 110 to the printer unit 2 is converted, in an exposure control unit 201, into a modulated optical signal for irradiating a photosensitive member 202. A latent image, formed by the irradiating light on the photosensitive member 202 is developed with toner in a developing unit 203. A recording sheet is transported from a sheet stacker unit 204 or 205, in synchronization with the front end of the latent image, and thus developed image is transferred onto the recording sheet in a transfer unit 206. The transferred image is fixed, in a fixing unit 207, onto the recording sheet, which is then discharged from the apparatus through a discharge unit 208. The sheets from the discharge unit 208 is discharged, into bins of a sorter 220 when the sorting function thereof is selected. On the other hand, when the sorting function is not selected, the sheets are discharged into the uppermost bin of the sorter 220.

In the following there will be described the process of recording two images on both faces of a recording sheet.

The recording sheet, subjected to the image fixation in the fixing unit 207, is transported to the discharge unit. 208, and is then transported in the opposite direction through a switching member 209, to a re-feeding stacker 210. When a next original becomes ready, the original image is read in the same manner as described above but the recording sheet is supplied from the re-feeding stacker 210, so that two original images can be recorded on both faces of a same recording sheet.

The external device 3 is connected, as shown in FIG. 1, with a cable to the reader unit 1, and the core unit 10 in the external device 3 controls various signals and various functions. The external unit 3 is provided therein with a facsimile unit 4 for facsimile transmission and reception, a file unit 5 for converting original information into electrical signals and storing the signals on a magnetooptical disk, a formatter unit 8 for developing the code information from a computer into image information, a computer interface unit 7 for interfacing with a LAN and a computer, an image memory unit 9 for storing the information from the reader unit 1 or temporarily storing the information from the computer, and a core unit 10 for controlling the above-mentioned units.

Figure 3:
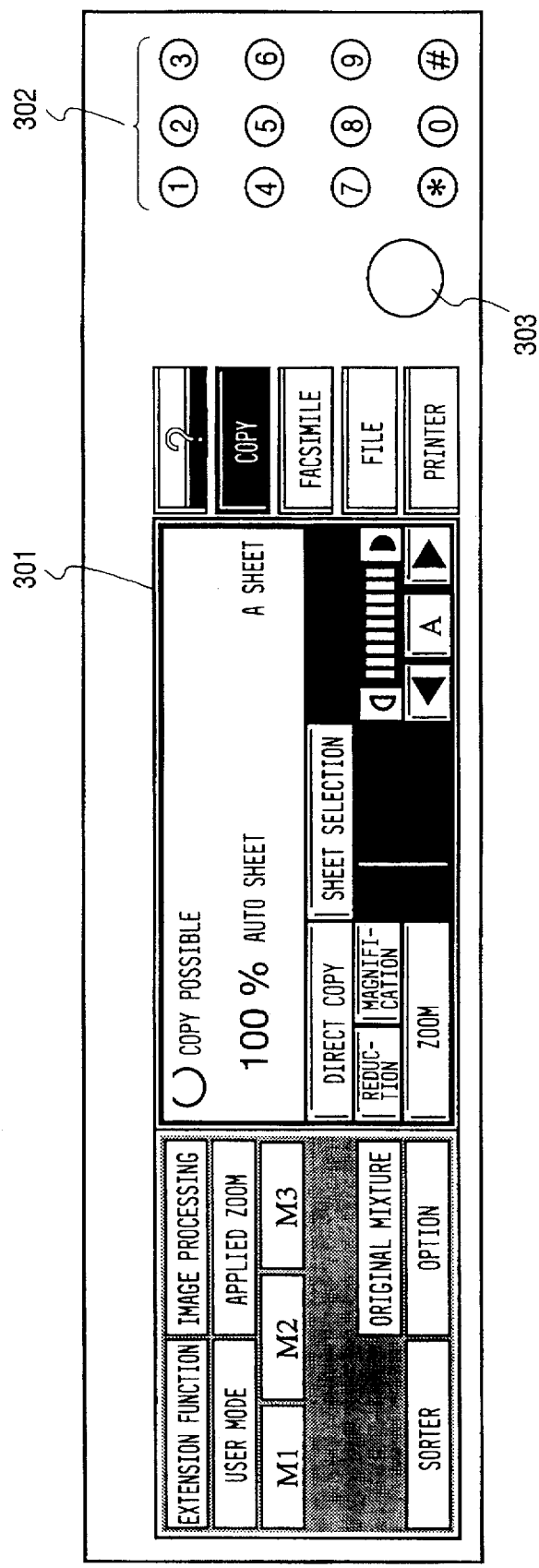
FIG. 3 is a plan view showing an example of an operation panel provided on the reader unit shown in FIG. 1.

FIG. 3 is a plan view showing an example of the operation panel provided on the reader unit 1 shown in FIG. 1.

Referring to FIG. 3, a display unit 301 displays the states of operation and messages. The surface of the display unit 301 is composed of a touch panel, serving as selection keys when touched with a finger. Numeral keys 302 are used for entering numbers. A start key 303 initiates the function of copying or facsimile.

In the following there will be described various functions of the multifunctional image processing apparatus of the present invention, with reference to flow charts shown in FIGS. 4 to 9, indicating examples of the control sequences of various functions, wherein parenthesized numbers indicate process steps.

After the start of a power supply, there is executed initialization (1). At the right-hand end of the display unit 301 of the operation panel there are displayed operation mode selection keys, and an operation mode is selected when the panel on a displayed selection key is touched. Then, a discrimination is made as to whether the selected mode is the copy mode (2), and, if the copy mode is selected, the sequence proceeds to a step (1) shown in FIG. 5.

Figure 6:
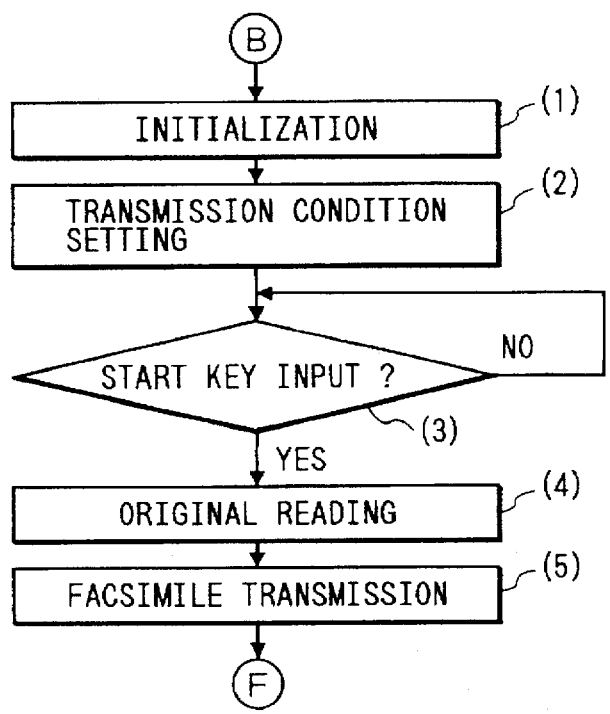

On the other hand, if the step (2) identifies that the copy mode is not selected, a discrimination is made as to whether the facsimile transmission mode is selected (3), and, if so, the sequence proceeds to a step (1) shown in FIG. 6.

Figure 7:
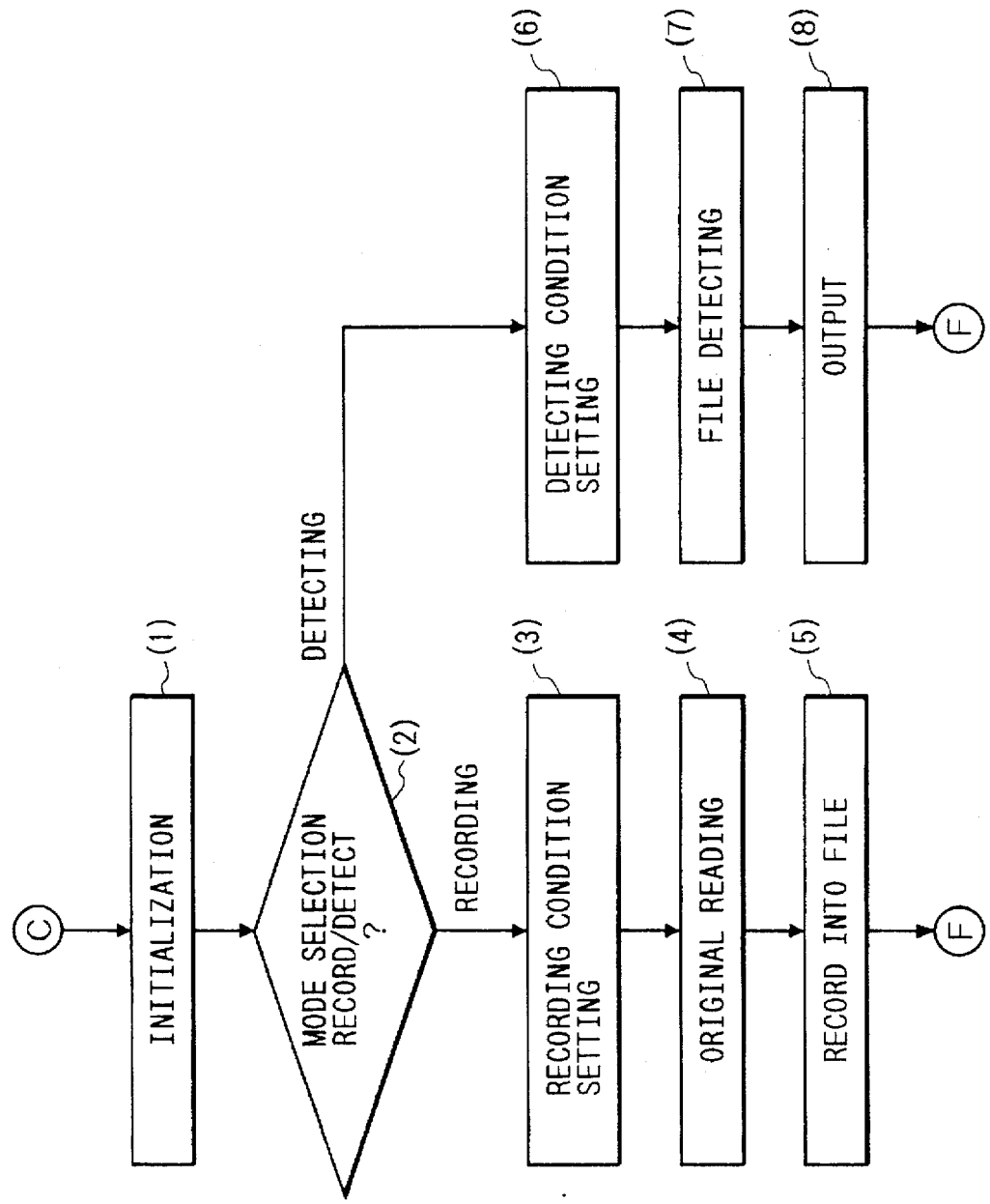

On the other hand, if the step (3) identifies that the facsimile transmission mode is not selected, a discrimination is made as to whether the file mode is selected (4), and, if selected, the sequence proceeds to a step (1) in FIG. 7.

Figure 8:
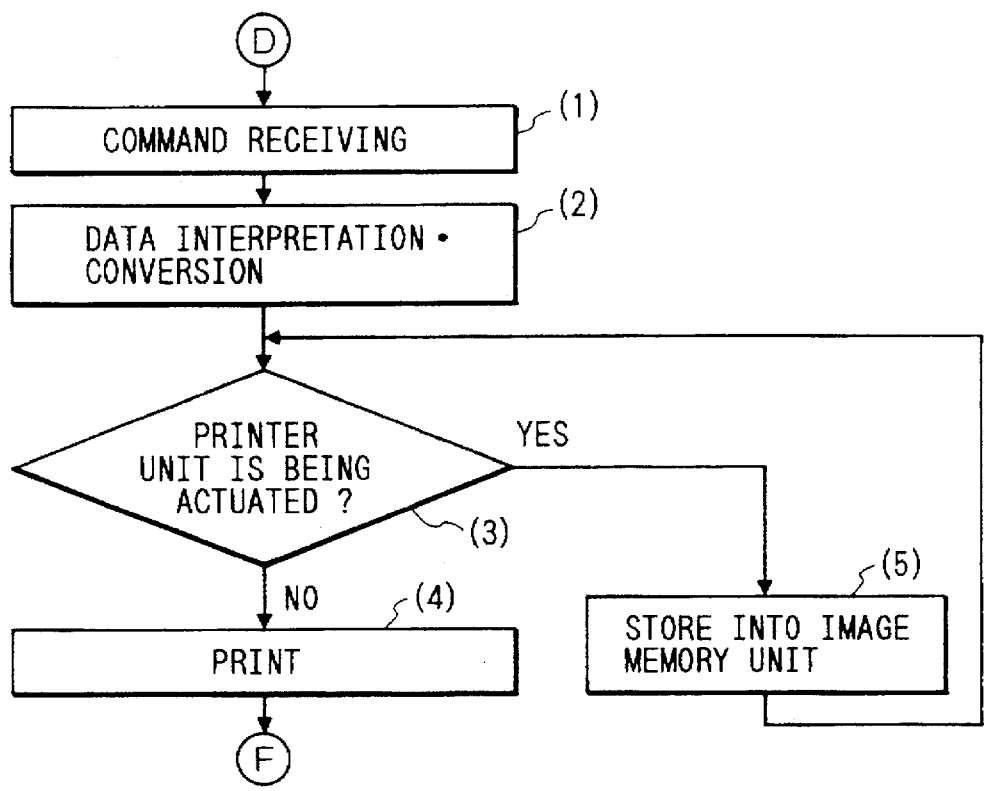

On the other hand, if the step (4) identifies that the file mode is not selected, a discrimination is made as to whether the input mode from the computer interface unit 7 is selected as the printer mode (5), and, if selected, the sequence proceeds to a step (1) in FIG. 8.

Figure 10:
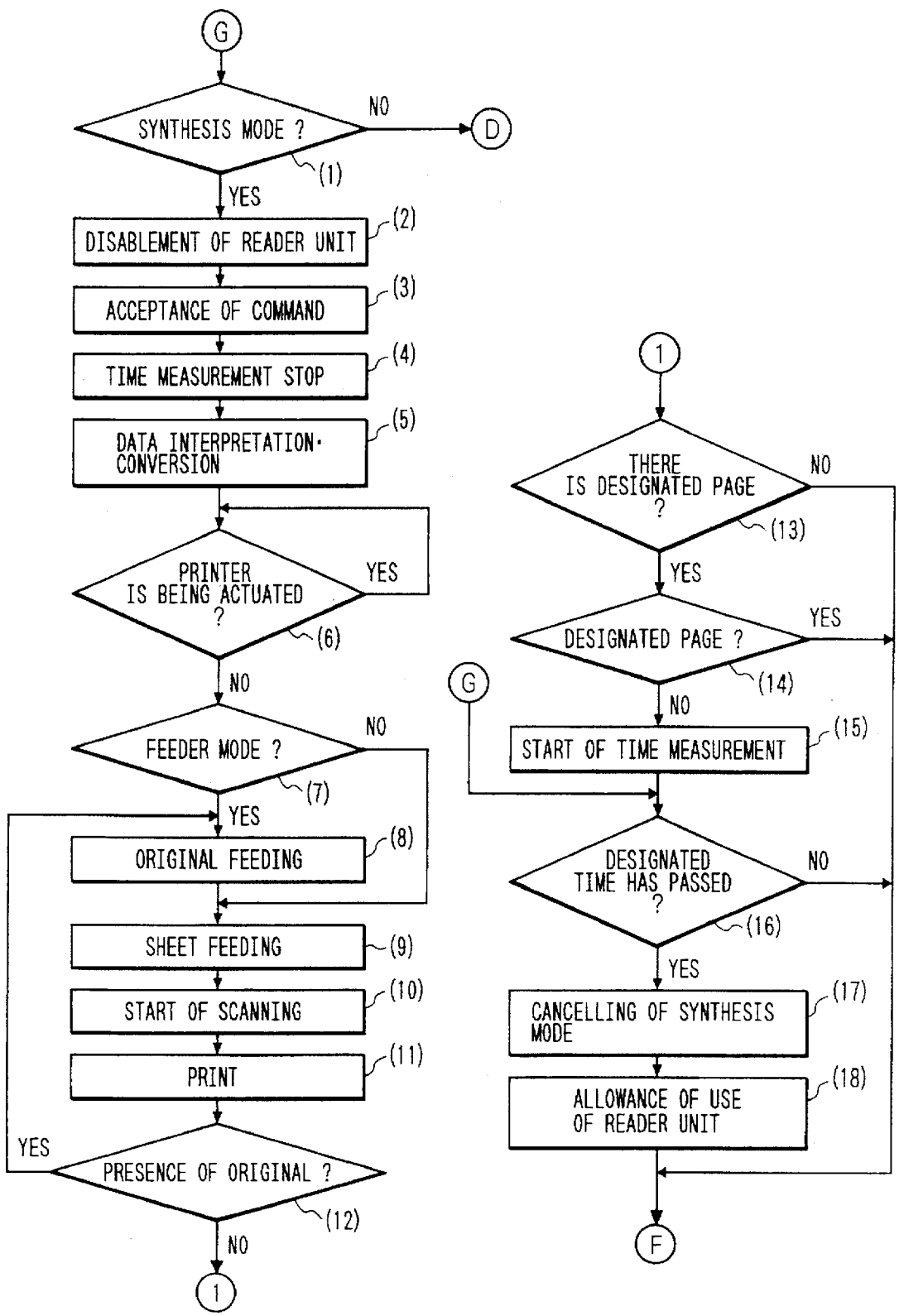
FIG. 10 is a flow chart showing an example of the image synthesizing process in the multifunctional image processing apparatus.

On the other hand, if the step (5) identifies that the input mode is not selected, a discrimination is made as to whether the image synthesis mode is selected as the printer mode (6), and, if selected, the sequence proceeds to a step (16) in FIG. 10. The image synthesis mode effects synthesis of an image read in the reader unit 1 with an image released from the formatter unit 8, as will be described later in more detail.

Figure 9:
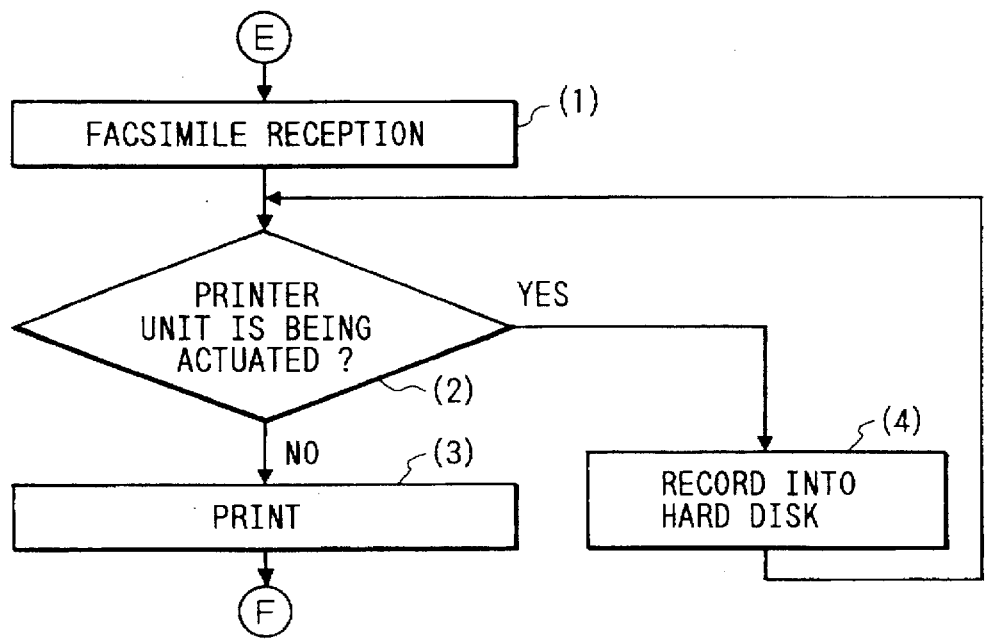

On the other hand, if the step (6) identifies that the image synthesis mode is not selected, a discrimination is made as to whether the facsimile reception mode is selected (7), and, if selected, the sequence proceeds to a step (1) in FIG. 9.

On the other hand, if the step (7) identifies that the facsimile reception mode is not selected, the sequence returns to the step (2) and repeats the above-mentioned steps.

Figure 4:
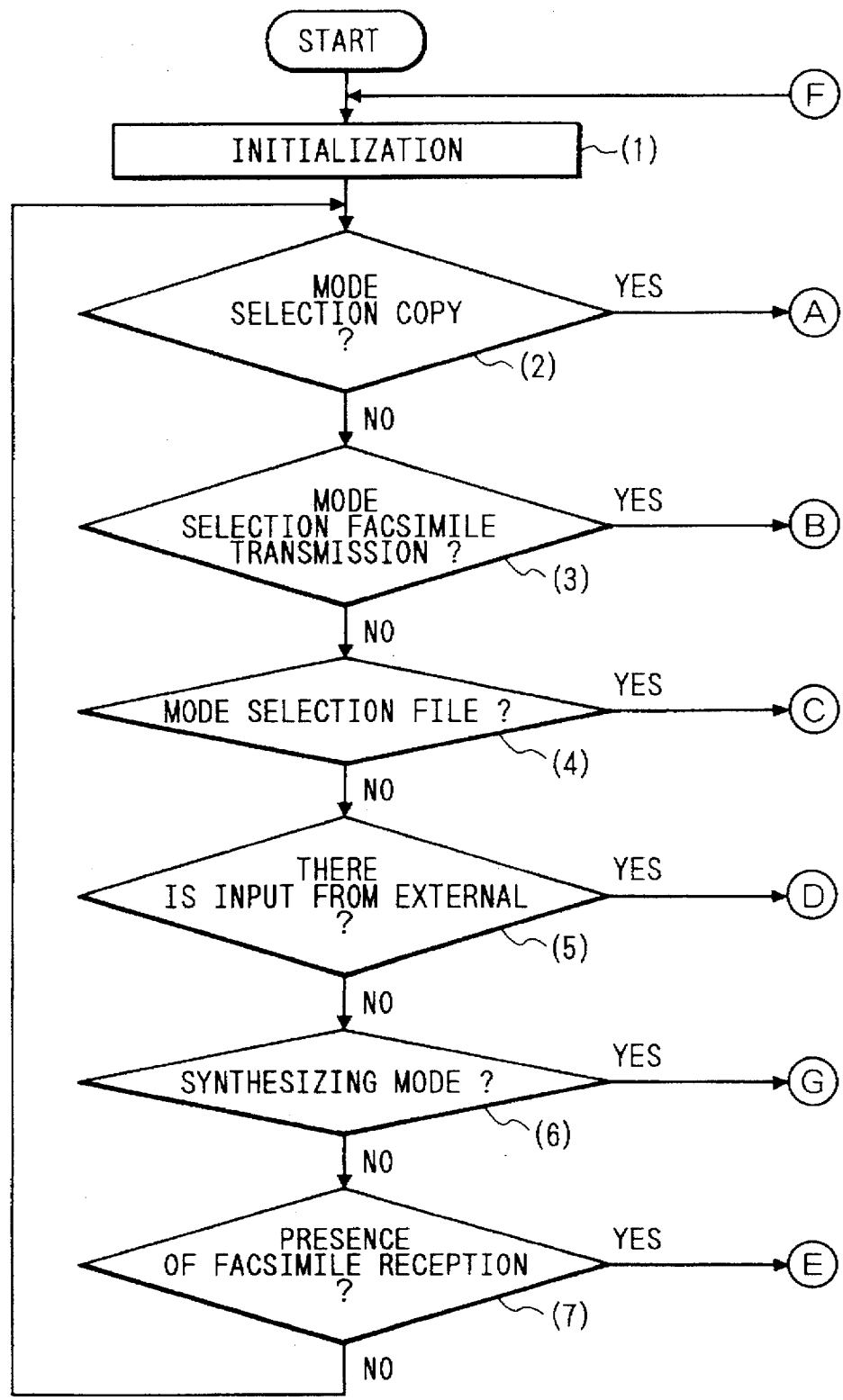
FIGS. 4 to 9 are flow charts showing control sequences of various functions in the multifunctional image processing apparatus.
Figure 5:
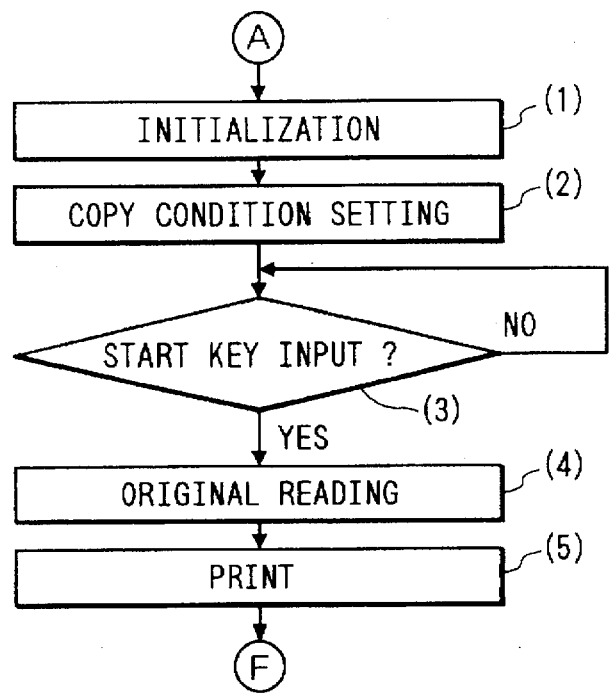

When the step (2) in FIG. 4 identifies that the copy mode is selected, the flow shown in FIG. 5 is initiated. At first there is executed initialization for the copying operation (1). Then copying conditions are set by reading the key information entered from the operation panel (2), and the actuation of the start key 303 is awaited (3). When the start key 303 is depressed, the original is read in the reader unit 1 (4), and the printing operation is conducted in the printer unit 2 as described in the foregoing (5). When the printing operation is completed, the sequence returns to the step (1) shown in FIG. 4, for the purpose of initialization.

When the step (3) in FIG. 4 identifies that the facsimile transmission mode is selected, the flow shown in FIG. 6 is initiated. At first there is executed initialization for the facsimile transmission (1). Then facsimile transmission conditions are set by reading the key information entered from the operation panel (2), and the actuation of the start key 303 is awaited (3).

When the start key 303 is depressed, the original is read in the reader unit 1 (4), and the obtained image data are supplied to the facsimile unit 4, which effects the facsimile transmission according to the set format and a predetermined protocol (5). After the transmission is completed, the sequence returns to the step (1) in FIG. 4.

When the step (4) in FIG. 4 identifies that the file mode is selected, the flow shown in FIG. 7 is initiated. At first, initialization is executed for the file operation (1). On the operation panel there are displayed mode selection keys for file recording and for file search, and the key input by the operator is awaited (2). If the recording key is selected, there is effected setting of the recording conditions (3). Then the original is read in the reader unit 1 (4), the obtained data are transferred to the file unit 5 and are recorded in the external memory device 6 thereof (5).

On the other hand, if the file search key is selected in the step (2), the search conditions are set (6), then the file is searched from the external memory device 6 (7), and the result of search is released (8). After the completion of file recording or file search, the sequence returns to the step (1) in FIG. 4 for initialization.

When the step (5) in FIG. 4 identifies the entry of command and data from an external apparatus, the flow shown in FIG. 8 is initiated. At first a command is received in the computer interface unit 7 (1), then the data are supplied through the core unit 10 to the formatter unit 8 and are converted into image information for printing (2). Then a discrimination is made as to whether the printer unit 2 is in operation (3), and, if not, the image information is supplied to the printer unit 2 and printed therein (4). Thereafter the sequence returns to the step (1) in FIG. 4.

If the printer unit 2 is in operation, the image information is stored in the image memory unit 9 (5). Then the sequence returns to the step (3), and the stored data are read and printed in the printer unit 2 when the printer unit 2 is not in operation (3, 4). Thereafter the sequence returns to the step (1) in FIG. 4.

On the other hand, when the step (5) in FIG. 4 identifies that command and data are not received from the external apparatus, a discrimination is made as to whether the operation in the synthesis mode is in progress (6), and, if in progress, the flow shown in FIG. 10 is initiated. If the operation in the synthesis mode is not in progress, a discrimination is made as to whether the facimile reception is in progress (7), and, if not, the sequence returns to the step (2) shown in FIG. 4. If it is identified that the facsimile reception is in progress, the flow shown in FIG. 9 is initiated. At first the facsimile reception is conducted by the facsimile unit 4 (1), then a discrimination is made as to whether the printer unit 2 is in operation (2), and, if not, the received data are supplied to the printer unit 2 and printed therein (3).

On the other hand, if the step (2) identifies that the printer unit 2 is in operation, the received data are stored in the rigid disk of the facsimile unit 4 (4), and are printed in the printer unit 2 when it is not in operation (2, 3). After the completion of the printing operation, the sequence returns to the step (1) in FIG. 4 for initialization.

The above-explained modes are executed according to the mode selection by the selection keys 301 of the operation panel, reception of information by the facsimile unit 4, or detection of the external command by the computer interface unit 7.

The core unit 10 controls the priority setting and the parallel execution of the operations of these functions.

In the following there will be described, with reference to FIG. 10, the scanner synthesis operation for synthesizing the image information, converted in the formatter unit 8, with the original image read in the reader unit 1, according to synthesis area data indicated by the keys 301, 302 of the operation unit shown in FIG. 3 or by the editor 11.

FIG. 10 is a flow chart showing an example of the image synthesizing sequence in the multifunctional image processing apparatus of the present invention, wherein parenthesized numbers (1) to (18) indicate process steps.

When the step (5) in FIG. 4 identifies the presence of an external input, the sequence normally proceeds to the printing sequence shown in FIG. 8, and a discrimination is made as to whether the synthesis mode is selected in the operation unit (1), and, if not, the sequence shown in FIG. 8 is initiated, and, if selected, the sequence shown in FIG. 10 is initiated. When the synthesis mode is initiated, the use of the reader unit 1 in the copy mode, facsimile transmission mode or file recording mode is inhibited (2). This is to prevent the original being used in the synthesis mode being replaced by an original for another mode, while the transmission of the image to be synthesized from the formatter unit 8 is awaited. Upon receiving a print command from the computer (3), the formatter unit 8 terminates the time measuring operation of a timer 10d (4), and converts the command and data into image information, representing characters etc. in the same manner as in the ordinary command converting operation (5). Then, if the printer unit is not in operation when the converted image information becomes ready for output (6), the data output to the printer unit is initiated. At this point, the reader control unit discriminates whether the original image reading is in the feeder mode (7). This discrimination is achieved by an unrepresented sensor provided in the original feeder 101 shown in FIG. 1, depending on whether an original is present on the original stacker. If the sensor identifies the presence of an original, the original is transported to the exposure position, prior to the reception of the image information from the formatter unit 8 (8). Then a recording sheet is fed from a suitable stacker (cassette) 204, 205 (9) to the transfer position 206. The scanner unit 104 is so moved that a latent image synthesized from the image information from the formatter unit 8 and from the original image is formed with a suitable timing on the photosensitive member 202 (10), and the original image data are read with the CCD 109. The original image thus read and the image data released from the formatter unit 8 are selectively supplied, according to data indicating the designated synthesis areas, in the external switching circuit to be described later, to the exposure control unit 201 and are printed by a known electrophotographic process (11). The printing operation will not be described further as it is similar to that in the above-described various modes.

Now reference is made to FIG. 11, for describing the configuration of the external switching circuit.

In FIG. 11, there are shown an image data signal 1101 from an external equipment; an image data signal 1102 from the above-mentioned image processing unit 110; a selector 1100 for selecting either the image signal 1101 or 1102; an image data signal 1103 selected by the selector 1100 and supplied to the exposure control unit 201 for forming the latent image; an area judging circuit 1105 for the main scanning direction and an area judging circuit 1106 for the sub scanning direction, for judging inside and outside of the area in respective directions; and an area judging circuit 1104 for effecting final area judgment, based on the results of judgment in the above-mentioned directions and transmitting the result of final judgment to the selector 1100 for selecting the signals accordingly. There are also provided a CPU 10a for effecting various image processings by controlling the access to the units 4–9 shown in FIG. 1 and the communication with the reader unit 1 and the printer unit 2, according to a control program stored in a ROM 10b; a RAM 10c for storing the time for cancelling the image synthesis mode instructed by the operation unit 20, the number of synthesized images (number of pages), the measured time etc.; and a timer 10d for effecting a time measuring process depending on the result of discrimination whether the number of pages of the synthesized images does not exceed a designated number of pages.

In the following there will be described a sequence of synthesizing the image data of plural originals with same external image data, with reference to the flow chart shown in FIG. 10.

At first a first original to be synthesized is fed from the stacker of the original feeder 101 (11), and the original feeder 101 discriminates, by means of the aforementioned sensor, whether a next original is present (12). If the next original is absent, the sequence is executed once after the printing of the synthesized image, and, in case of presence of the next original, the original is changed (8) and a next recording sheet is fed.

The same external image data can be synthesized with each of the images of plural originals, by repeating the above-described sequence. In the present embodiment, the formatter unit 8 can send same image data to the external switching circuit any number of times, in synchronization with the timing of original reading of the reader unit 1.

The main scanning area judging circuit 1105 receives a pixel clock signal 1107 in the main scanning direction and a main scanning reference signal 1108 indicating the reference position of each main scanning line, and judges, for each main scanning line, whether the current scanning position is inside or outside the designated synthesis area.

Also the sub scanning area judging circuit 1106 receives a line clock signal 1110 in the sub scanning direction and a sub scanning reference signal 1109 indicating the reference position in the sub scanning direction, and discriminates whether the current scanning position is inside or outside the designated synthesis area.

As other operations utilizing the reader unit 1 are inhibited during the synthesis mode as explained before, it is desirable, after the completion of necessary synthesis, to cancel the synthesis mode thereby enabling other operations.

In the following there will be explained a method of cancellation by page designation.

The number of pages of the external image data to be synthesized can be designated, for example, by the keys of the operation unit 20 shown in FIG. 1. After the completion of synthesis of the same external image data with plural originals, a discrimination is made as to whether a page number is designated for cancelling the synthesis mode (13).

If the designation of page number is identified, the sequential number of pages of the recorded external image data is counted, from the start of the synthesized recording, and the obtained count is compared with the pre-designated number of pages for mode cancellation (14). In case the number of pages is not designated or the designated number of pages is reached in the step (13) or (14), the sequence proceeds to the step (1) in FIG. 4.

On the other hand, if the step (14) identifies that the designated number of pages has not been reached, there is initiated the counting operation of the designated time by the timer 10d (15).

Subsequently a discrimination is made as to whether the pre-designated time has elapsed (16). The sequence starting from this step (16) is also executed in case the step (5) in FIG. 4 identifies the absence of the external input or in case the step (6) in FIG. 4 identifies the selection of the synthesis mode.

In the step (16) identification is made that the designated time has elapsed, the synthesis mode is automatically cancelled (17), then the request for use of the reader unit 1 is permitted (18), and the sequence returns to the step (1) in FIG. 4.

In the foregoing description, the image synthesis mode is cancelled, based on the number of pages, designated from the operation unit, of the print data to be subjected to scanner synthesis, and it is also possible to designate the number of pages of the originals to be read by the reader unit and to cancel the image synthesis mode, based on the number of pages of the originals.

In the following there will be described, with reference to FIGS. 12A to 14B, the sequence of operation in the scanner synthesis mode.

FIGS. 12A to 14B are views showing the transitions of the displayed image of the display unit 301 in the scanner synthesis mode. The operation unit 301 is composed of a display DSP with a touch panel including keys K1–K5, and the instruction for operation can be entered by touching one of the key areas displayed on the display DSP.

Figure 12A:
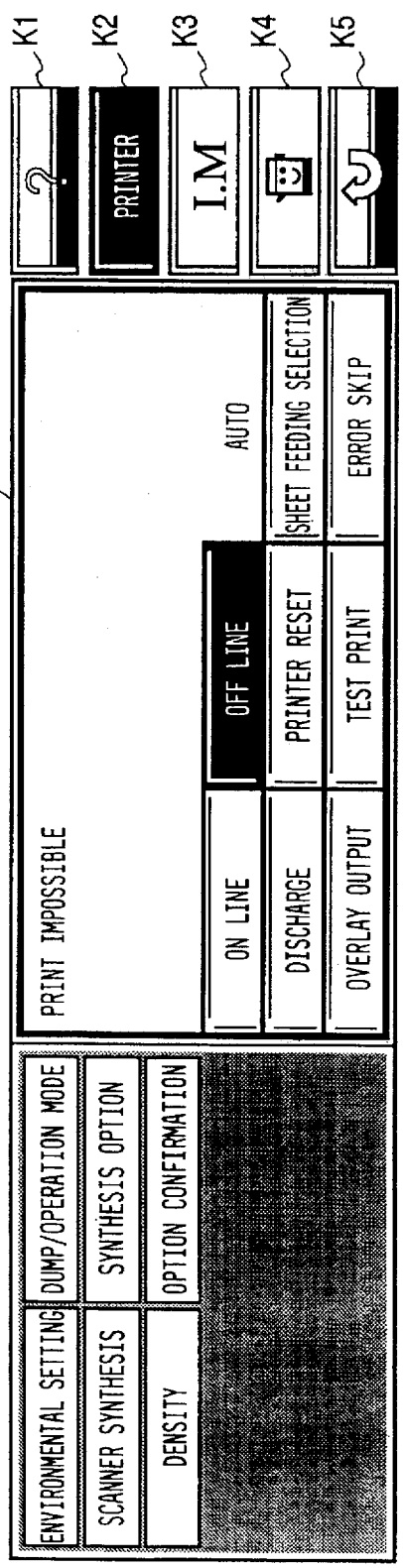

At first a key area "OFF LINE" is touched as shown in FIG. 12A, whereby the display of the area is inverted and the printer unit is shifted to the off-line state. By touching a key area "SCANNER SYNTHESIS" in this state, the display DSP is switched to a state shown in FIG. 12B, wherein the display of the key area "SCANNER SYNTHESIS" is inverted.

Then an area, in which the image is to be fitted, is designated by two diagonal points on the editor 11, by means of a pen, or by touching a key area "TEN KEY INPUT" to shift the display DSP to a state shown in FIG. 12C and by entering the numbers of coordinates by means of the numeral keys 302 of the operation unit.

Figure 12B:
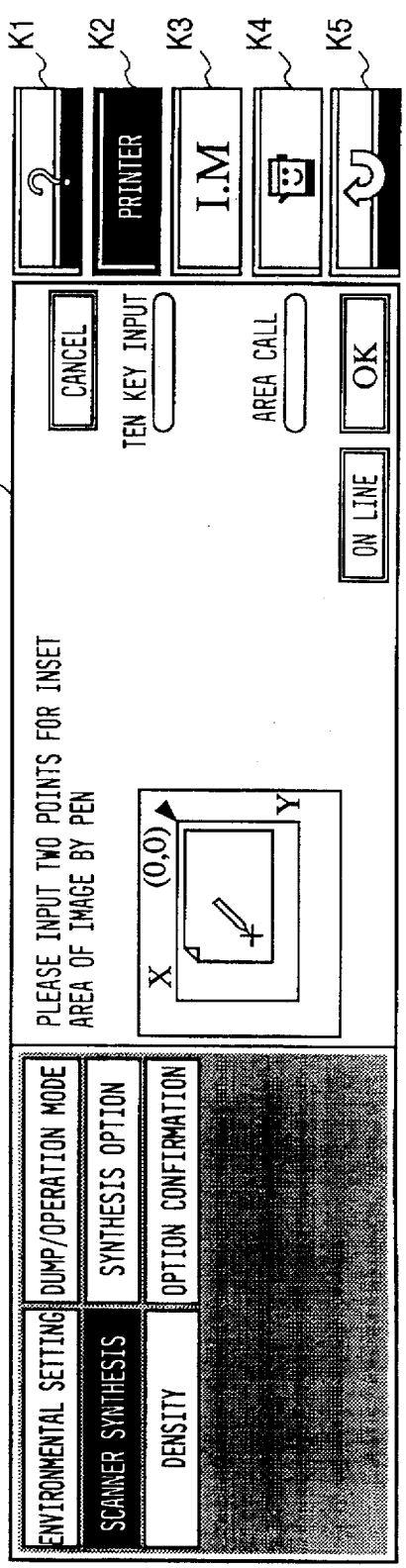

When the coordinates of two points are entered in the state shown in FIG. 12B or 12C, the entered two points are displayed as shown in FIG. 12D. If a key area "POINT CLEAR" is depressed in this state, the display DSP is switched to a state shown in FIG. 12B, whereby the two points designating the area for image fitting are entered again. In the present embodiment, the point clearing operaiton is conducted one by one among the designated two points.

Figure 13A:
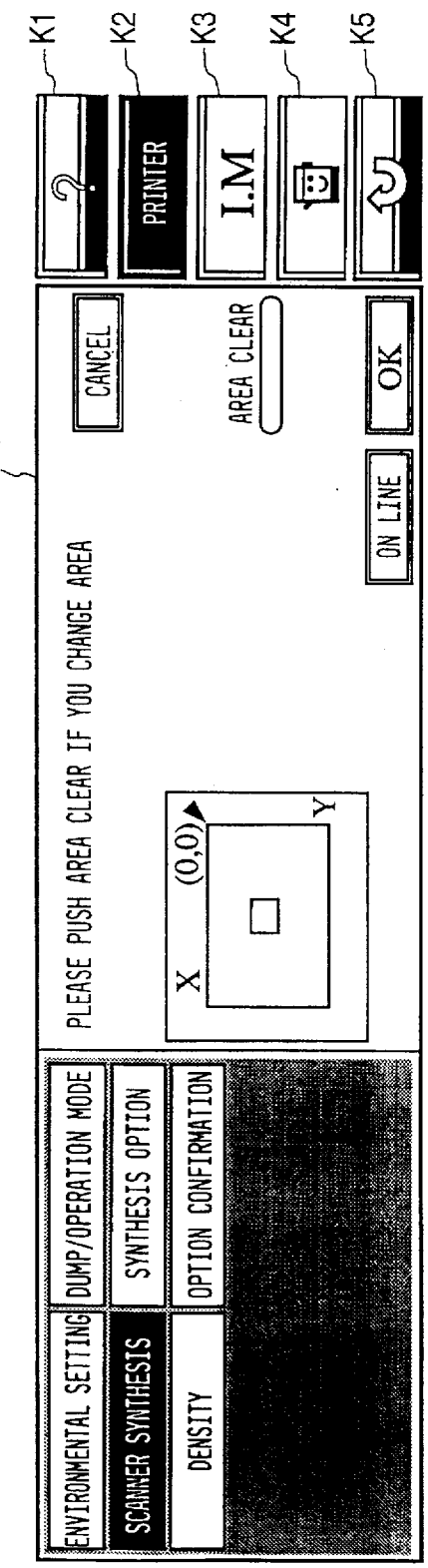
Figure 13B:
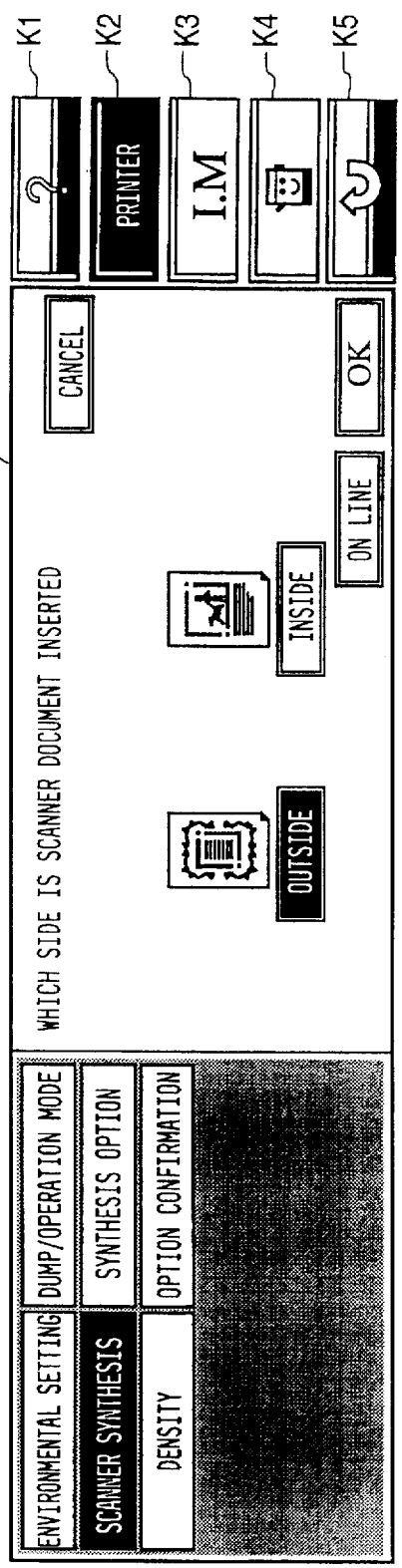

On the other hand, if a key area "OK" is touched in the state shown in FIG. 12D, the display DSP is shifted to a state shown in FIG. 13B for designating whether the original image read by the scanner is to be synthesized either inside or outside of the image fitting area designated above. In the illustrated example, the outside is selected whereby the "OUTSIDE" area is inverted in display.

If a key area "CANCEL" is touched in the state shown in FIG. 13B, the display DSP is shifted to a state shown in FIG. 13A, in which the alteration of the area is enabled. By touching a key area "AREA CLEAR" in this state, the display is shifted to a state shown in FIG. 12B for re-designation of the area. Also if the key area "CANCEL" is touched in a state shown in FIG. 13A, the display DSP is shifted to a state shown in FIG. 12A.

On the other hand, if a key area "OK" is touched in a state shown in FIG. 13A, the display DSP is shifted again to a state shown in FIG. 13B, and, if the key area "OK" is touched in this state, the display DSP is shifted to a state shown in FIG. 13C. In this state, the number of pages of the print data to be synthesized (as an arbitrary number from 1 to 999) is entered with the numeral keys. The print data up to the designated number of pages are subjected to scanner synthesis, while the print data thereafter are printed in ordinary manner. If the key area "OK" is touched in the above-mentioned state, the display DSP is shifted to a state shown in FIG. 13D, and, if a key area "SCANNER SYNTHESIS" is touched in this state, the display DSP is shifted to a state shown in FIG. 13A.

On the other hand, if a key area "CONSECUTIVE" is touched in a state shown in FIG. 13C, the display DSP is shifted to a state shown in FIG. 14A, in which the operator designates either "DESIGNATION OF PAGE NUMBER" or "CONSECUTIVE". If a key area "DESIGNATION OF NUMBER OF PAGES" is touched in the above-mentioned display state, the display DSP is shifted to a state shown in FIG. 13C, and, if a key area "CONSECUTIVE" or "OK" is touched, the display DSP is switched to a state shown in FIG. 13D. In the consecutive mode, all the entered print data are subjected to scanner synthesis. In the state shown in FIG. 13D, if a key area "DESIGNATION OF NUMBER OF PAGES", "OK" or "CANCEL" is touched, the display DSP is switched to a state shown in FIG. 13C. Then, when the setting operation for the scanner synthesis is completed, the display DSP is switched to a state shown in FIG. 14B, for sheet selection.

Figure 15:
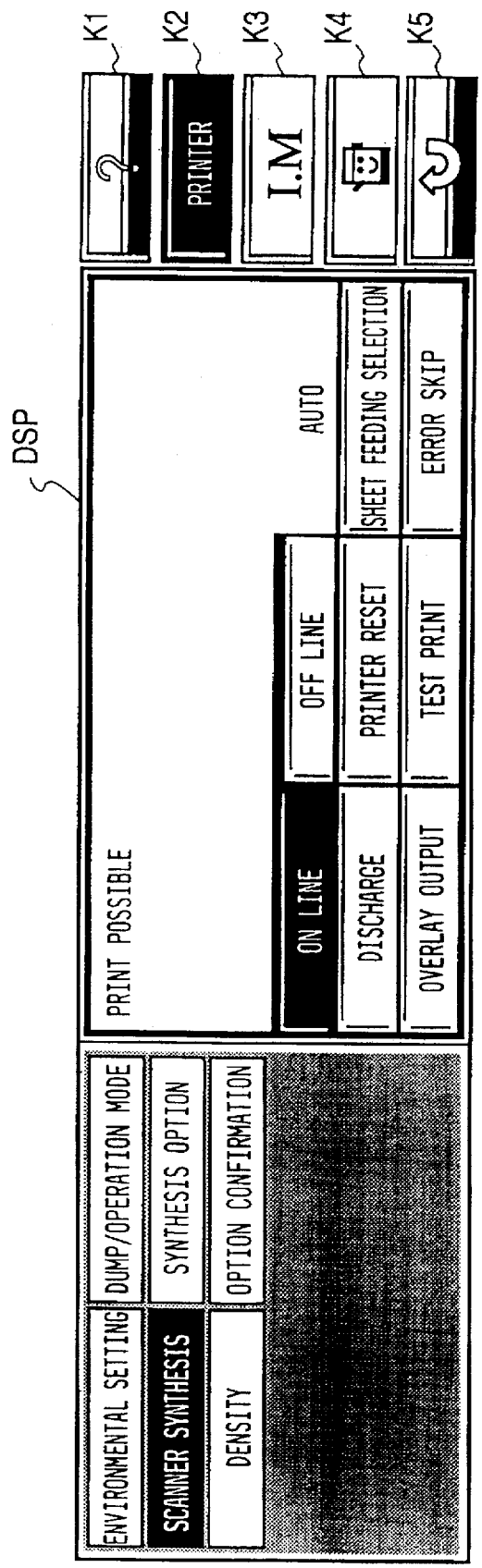
FIG. 15 is a view showing an example of the scanner synthesis stand-by image frame.

FIG. 15 shows an example of the display of a stand-by state for scanner synthesis.

FIGS. 16A and 16B show an example of the option setting display in the scanner synthesis mode, relating particularly to image quality setting operations.

In a display state shown in FIG. 16A, in which a key area "SCANNER SYNTHESIS" is inverted in display, the depression of a key area "IMAGE QUALITY" shifts the display to a state shown in FIG. 16B to enable designation of density (hi-fi/character emphasis), sharpness etc. It is thus rendered possible to regulate the print density or to emphasize the image contrast, according to the kind or original, such as a character original or a photograph original. If a key area "OK" or "C" is touched in a display state shown in FIG. 16B, the display DSP is switched to a state shown in FIG. 16A, whereby the re-setting of the conditions is rendered possible.

Figure 17A:
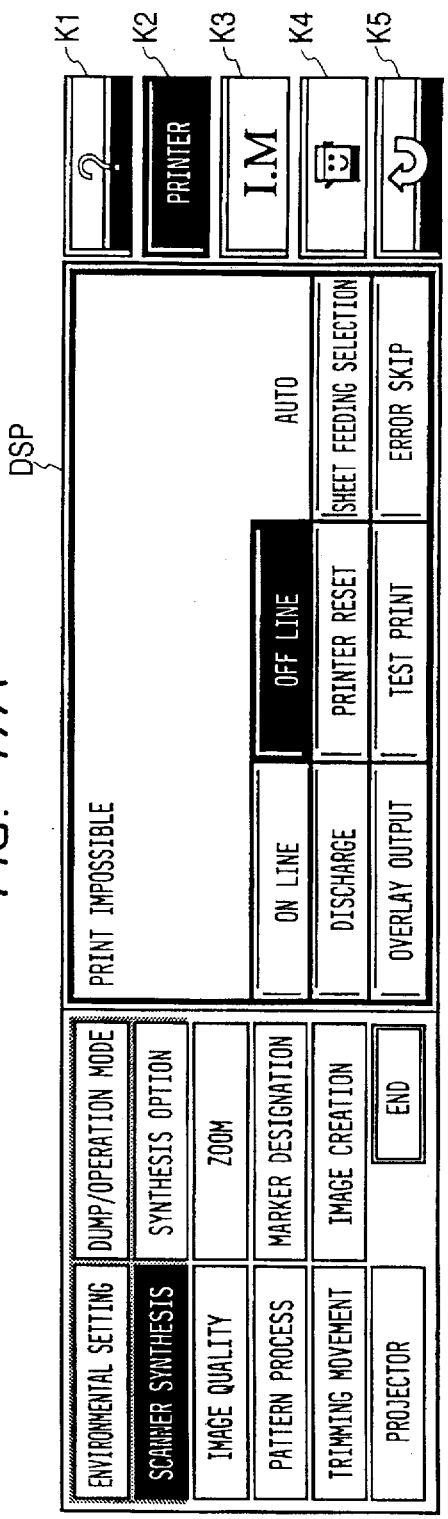
FIGS. 17A and 17B are views showing an example of the image frame for image creation setting as an option of the scanner synthesis.
Figure 17B:
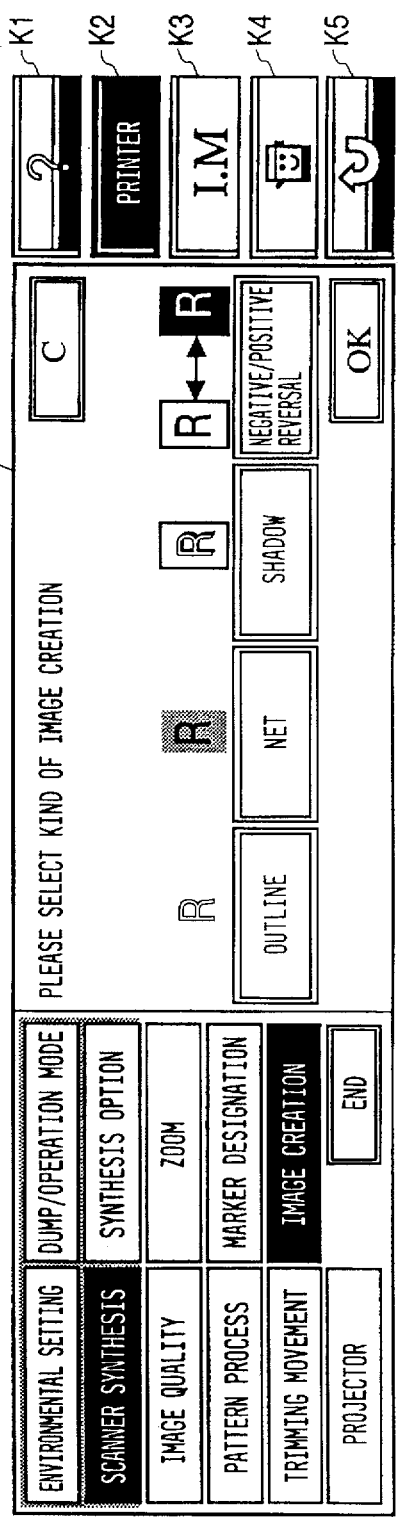

FIGS. 17A and 17B show an example of the option setting display in the scanner synthesis mode, relating particularly to image creation setting operations.

In a display state shown in FIG. 17A, in which a key area "SCANNER SYNTHESIS" is inverted in display, the depression of a key area "IMAGE CREATE" shifts the display DSP to a state shown in FIG. 17B, to enable various image creating processes, as indicated by key areas "OUTLINE", "NET", "SHADOW" and "NEG/POS REVERSAL". If a key area "OK" or "C" is touched in a display state shown in FIG. 17A, the display DSP is switched to a state shown in FIG. 17A, whereby the re-setting of the conditions is rendered possible.

FIGS. 18A to 19B show an example of the option setting display in the scanner synthesis mode, relating particularly to trimming/movement setting operations.

Figures 18A, 18B:
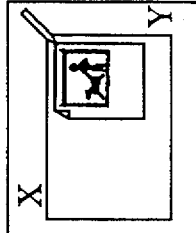

In a display state shown in FIG. 18A, in which a key area "SCANNER SYNTHESIS" is inverted in display, the depression of a key area "TRIMMING/MOVEMENT" shifts the display DSP to a state shown in FIG. 18B, in which the key area "TRIMMING/MOVEMENT" is inverted in display.

Figures 18C, 18D:
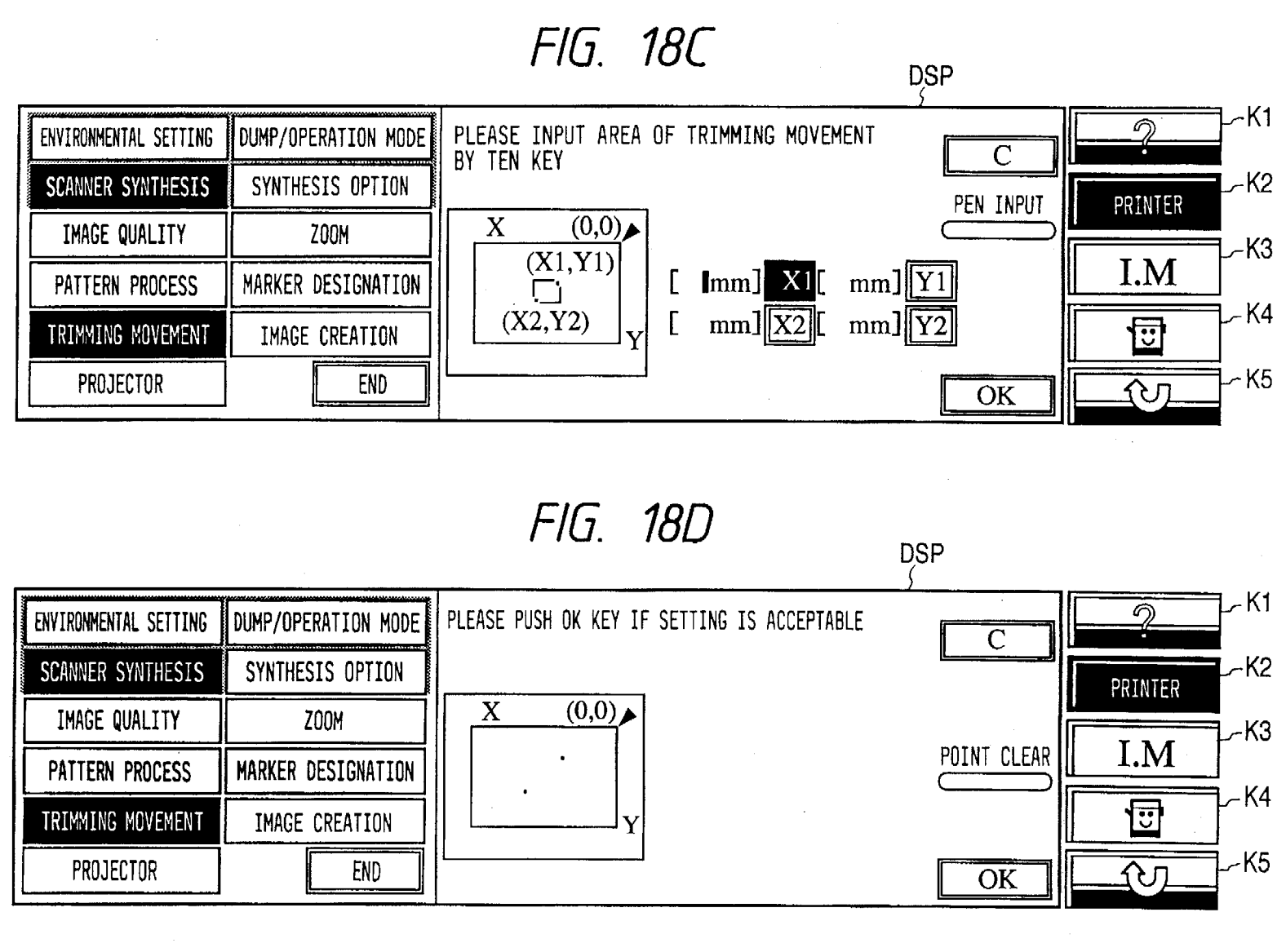

Then an area, in which the image is to be fitted, is designated by two diagonal points on the editor 11, by means of a pen, or by touching a key area "TEN KEY INPUT" to shift the display DSP to a state shown in FIG. 18C and by entering the coordinate values by means of the numeral keys 302 of the operation unit.

When the coordinates of two points are entered in the state shown in FIG. 18B or 18C, the entered two points are displayed as shown in FIG. 18D. If a key area "POINT CLEAR" is depressed in this state, the display DSP is switched to a state shown in FIG. 18B, whereby the two points designating the area for image fitting are entered again. In the present embodiment, the point clearing operation is conducted one by one among the designated two points.

Figure 19A:
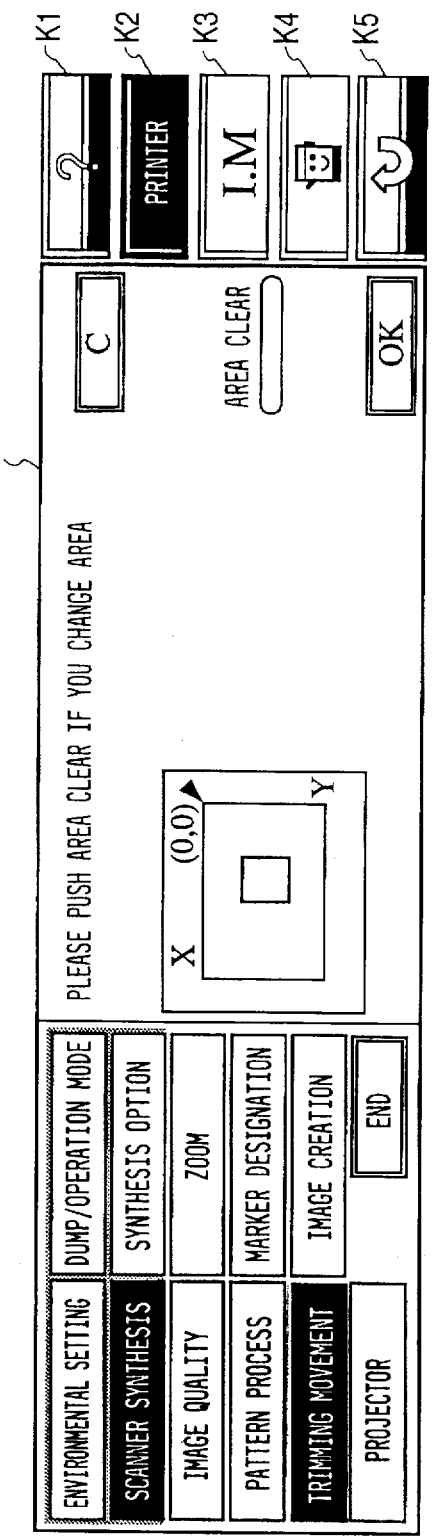
Figure 19B:
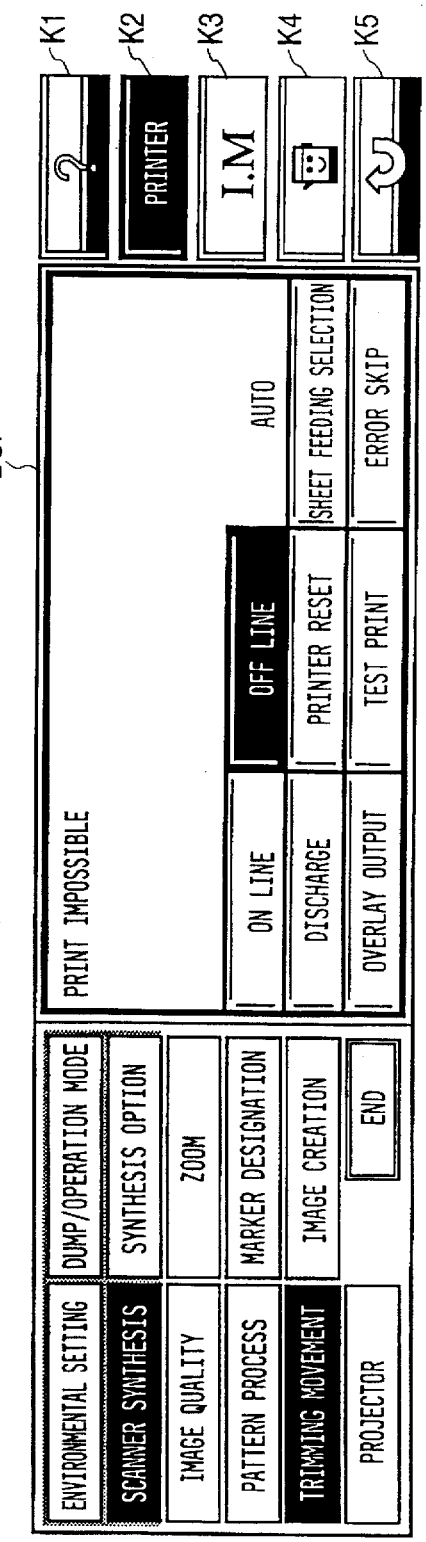

On the other hand, if a key area "OK" is touched in the state shown in FIG. 18D, the display DSP is shifted to a state shown in FIG. 19B. If a key area "TRIMMING/MOVEMENT" is touched, the display DSP is switched to a state shown in FIG. 19A, in which the designated trimming or movement is graphically displayed. If the key area "OK" is touched in this state, the display DSP is switched again to the state shown in FIG. 19B, and the trimming/movement setting operation is thus completed. On the other hand, if a key area "AREA CLEAR" is touched in a state shown in FIG. 19A, the display DSP is switched to a state shown in FIG. 18B, whereby the area designation for trimming/movement is enabled again.

FIGS. 20A to 21B show an example of the option setting display in the scanner synthesis mode, relating particularly to zoom setting operations.

Figure 20A:
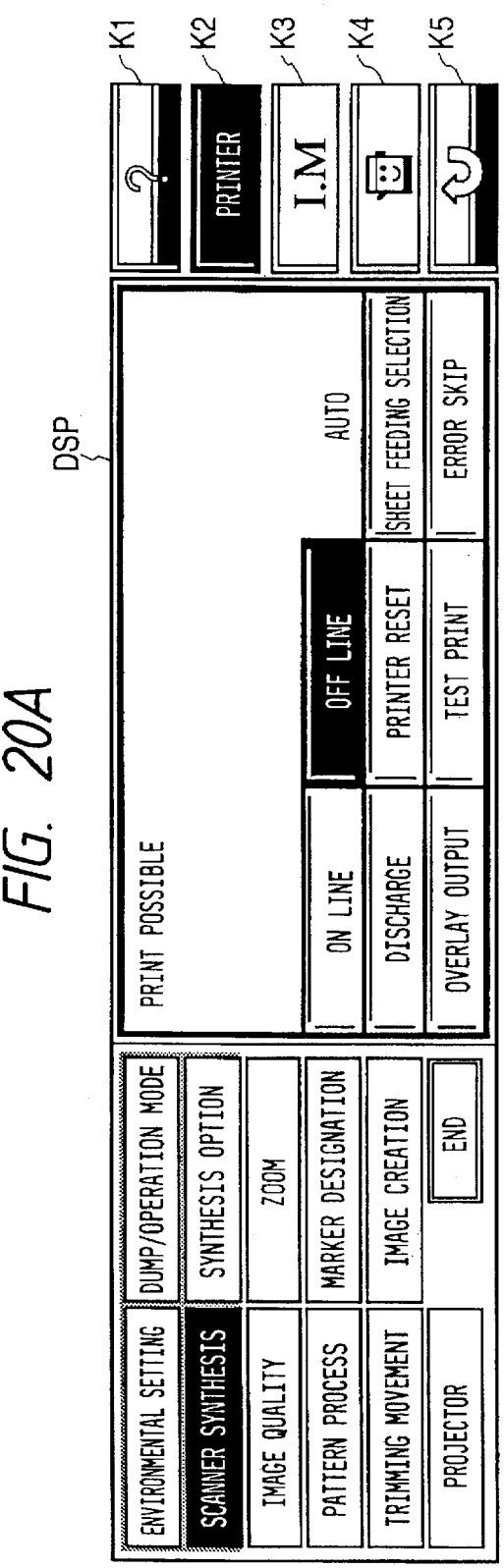
FIGS. 20A to 21B are views showing examples of the image frame for zoom ratio setting as an option of the scanner synthesis.
Figure 20B:
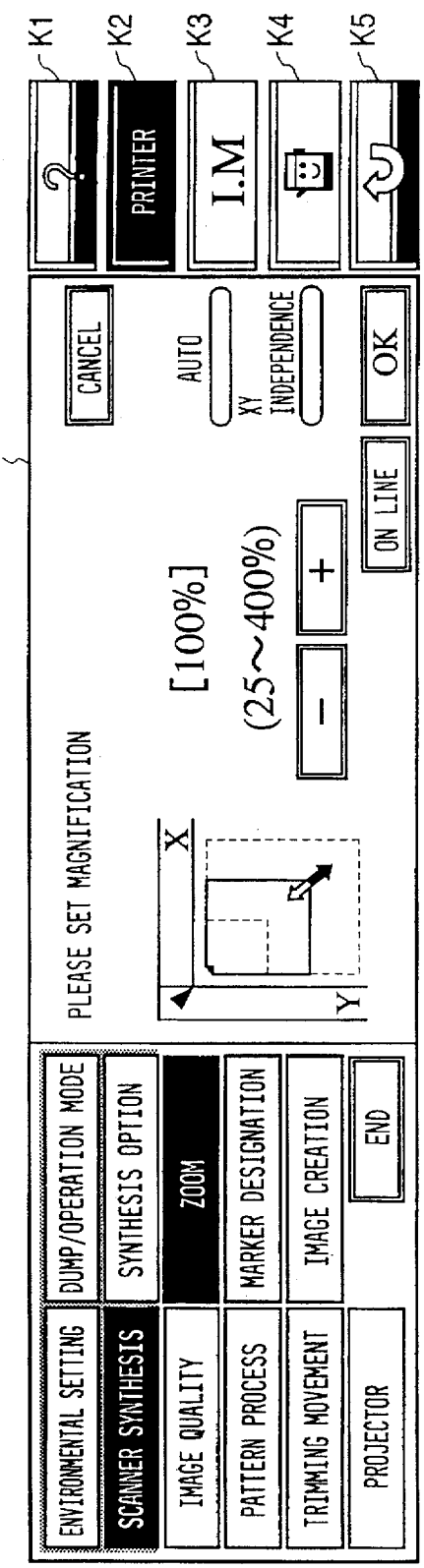
Figure 20C:
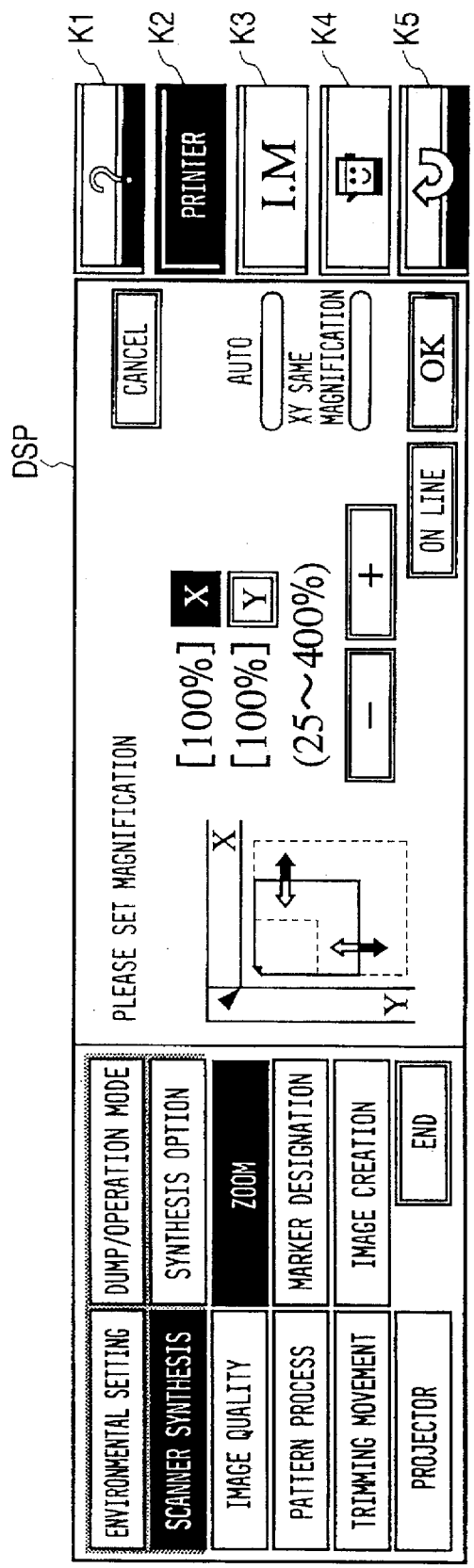

In a display state shown in FIG. 20A, in which a key area "SCANNER SYNTHESIS" is inverted in display, the depression of a key area "ZOOM" shifts the display DSP to a state shown in FIG. 20B, in which the key area "ZOOM" is inverted in display. If a key area "XY INDEPENDENT" is touched in this display state, the display DSP is switched to a state shown in FIG. 20C, enabling zooming operation (within a range of 20 to 400%, with 100% taken as the original state) independently in the vertical and horizontal directions. If a key area "XY SAME MAGNIFICATION" is touched in this display state, the display DSP is switched to a state shown in FIG. 20B. If a key area "OK" is touched in the display state shown in FIG. 20B or 20C, the display DSP is switched to a state shown in FIG. 20A, whereby the zoom setting operation is completed.

Figure 21A:
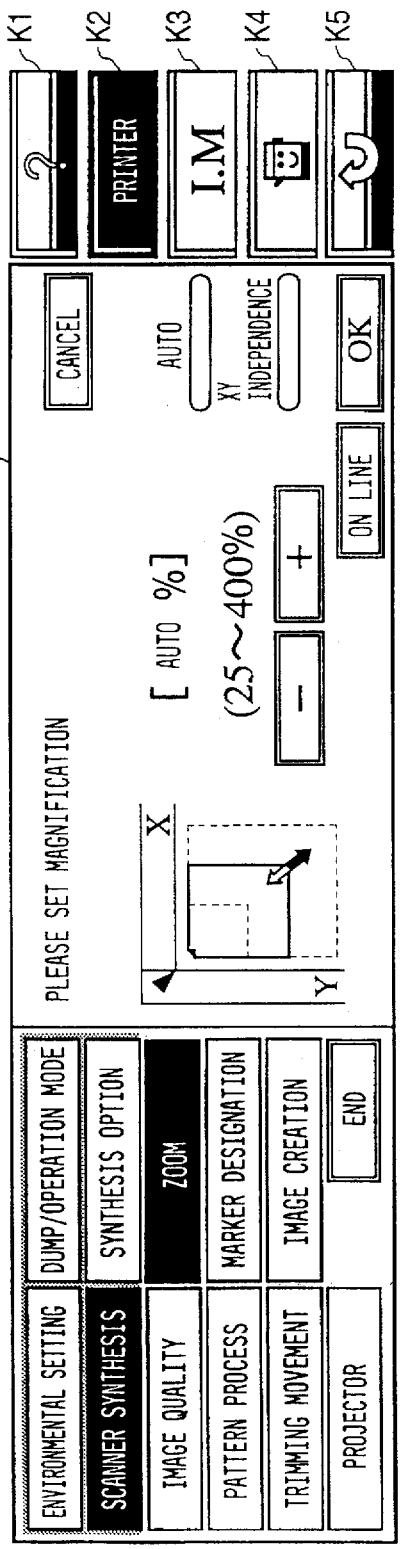
Figure 21B:
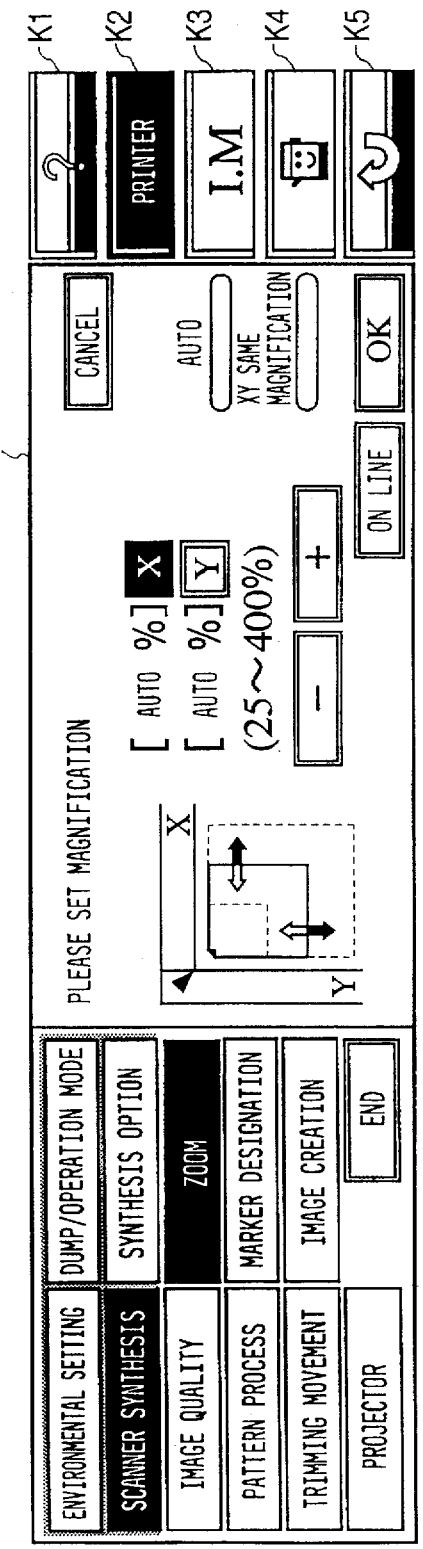

On the other hand, if a key area "AUTO" is touched in a display state shown in FIG. 20B, the display DSP is switched to a state shown in FIG. 21A, and, if a key area "XY INDEPENDENT" is touched in this display state, the display DSP is switched to a state shown in FIG. 21B. If a key area "OK" is touched in a display state shown in FIG. 20B or 20C, the display DSP is switched to a state shown in FIG. 20A, whereby the zoom setting operation is completed.

When the above-mentioned "AUTO" is designated, and if the original image read by the scanner is to be synthesized inside the area of synthesis, the image magnification is determined, based on the size of the original image and that of the designated area of synthesis, so as to select a maximum magnification capable of fitting the original image in the entire area of synthesis. On the other hand, if the original image read by the scanner is to be synthesized outside the area of synthesis, the image magnification is determined, based on the size of the original and that of the recording sheet, so as to select a maximum magnification capable of fitting the original image in the entire recording sheet. However, if the above-mentioned "TRIMMING/ MOVEMENT" is designated, the magnification is determined according to the size of the trimming area, instead of the original size.

The above-explained various operations for scanner synthesis allow to scan a rectangular area of the original, such as a letterhead, a logo mark or an illustration, and to synthesize such area with the data from the computer, on a single recording sheet.

The present invention is not limited to the foregoing embodiments, but is subject to various modifications within the scope and spirit of the appended claims.

What is claimed is:

1. An image synthesizing apparatus comprising:
   reading means for reading an image in units of an original;
   input means for inputting print data from an external apparatus;
   first setting means for setting a synthesis mode for synthesizing image data output from said reading means and a different print data input from said input means for recordation;
   second setting means for setting a number of pages of different print data to be synthesized in the synthesis mode;
   synthesizing means for synthesizing the image data output from said reading means and the different print data of each page input from said input means;
   control means adapted, when the synthesis mode is set by said first setting means, to maintain the synthesis mode until inputting of the different print data of the number of pages set by said second setting means is complete, and to cancel the synthesis mode after the different print data of the set number of pages has been input.

2. An image synthesizing apparatus according to claim 1, wherein said control means is adapted, after cancellation of the synthesis mode, to cause the print data, input by said input means, to be recorded in a normal print mode.

3. An image synthesizing apparatus according to claim 1, wherein said control means is adapted, while said synthesis mode is set, to inhibit a function of said reading means other than for the synthesis mode, and to enable the function of said reading means after the synthesis mode is cancelled.

4. An image synthesizing apparatus comprising:
   reading means for reading the image of an original;
   input means for inputting print data from an external apparatus;
   first setting means for setting a synthesis mode for synthesizing image data output from said reading means and the print data input by said input means for recordation;
   second setting means for setting a number of pages of the print data to be synthesized in the synthesis mode; and
   control means adapted, when the synthesis mode is set by said first setting means, to cancel the synthesis mode in response to an absence of input of print data from said input means for a predetermined time, prior to a finish of the input of the print data of the number of pages set by said second setting means.

5. An image synthesizing apparatus according to claim 4, wherein said control means is adapted, while the synthesis mode is set, to inhibit a function of said reading means other than for the synthesis mode, and to enable the function of said reading means after the synthesis mode is cancelled.

6. An image synthesizing apparatus comprising:
   reading means for reading an image of an original;
   input means for inputting print data from an external apparatus;
   process means for processing image data output from said reading means and print data input by said input means;
   first setting means for setting a first process mode for processing the image data output from said reading means, without utilizing said input means;
   second setting means for setting a second process mode for synthesizing the image data output from said reading means and the print data input from said input means for recordation;
   designation means for designating a number of pages of the print data to be synthesized in the second process mode; and
   control means adapted to inhibit the setting of the first process mode when the second process mode is set by said second setting means, and to cancel the second process mode and to enable the setting of the first process mode in response to an absence of input of the print data for a predetermined time prior to a finish of the input of the print data of the number of pages designated by said designation means.

7. An image synthesizing apparatus according to claim 6, wherein the first process mode includes a copy mode or a facsimile transmision mode.

8. An image synthesizing apparatus according to claim 6, wherein said control means is adapted to cancel the second process mode and to enable setting of the first process mode, after a competition of the input of the print data of the number of pages designated by said designation means.

9. An image synthesizing method comprising the steps of:
   a) setting a synthesis mode for synthesizing image data of an original output from a reading means and print data input from an input means;
   b) setting a number of pages of different print data to be synthesized;
   c) reading an image in units of the original by said reading means;
   d) inputting the different print data for a plurality of pages by said input means;
   e) synthesizing the original image read in said step c) and the different print data of each page input in said step d), respectively; and
   f) maintaining the synthesis mode until the inputting of the different print data for the plurality of pages set in said step b) is finished, and cancelling the synthesis mode after the different print data for the plurality of pages has been input.

10. A method according to claim 9, wherein in said step e), when the synthesis mode is cancelled, a normal recording mode for recording the print data input by said input means is set.

11. A method according to claim 9, wherein operating said reading means is inhibited except for the synthesis during the synthesis mode is set.

12. An image synthesizing method comprising the steps of:

a) setting a synthesis mode for synthesizing image data of an original output from reading means and print data input from input means;

b) setting a number of pages of different print data to be synthesized;

c) reading an image of the original by said reading means;

d) inputting the different print data for a plurality of pages by said input means; and e) cancelling the synthesis mode in response to an absence of an input of print data from said inputting means for a predetermined time before inputting the different print data for the plurality of pages set in said step b) is finished.

13. A method according to claim 12, wherein operating said reading means is inhibited except for the synthesis when the synthesis mode is set.

14. An image synthesizing method in an image synthesizing apparatus which includes, reading means for reading an image of an original, input means for inputting print data from an external apparatus, process means for processing image data output from said reading means and print data input by said input means, first setting means for setting a first process mode for processing the image data output from said reading means, without utilizing said input means, and second setting means for setting a second process mode for synthesizing the image data output from said reading means and the print data input from said input means for recordation, said method comprising the steps of:

a) setting a number of pages of print data to be synthesized in the second process mode; and b) inhibiting a setting of the first process mode during the setting of the second process mode, and cancelling the second process mode in response to an absence of an input of print data for a predetermined time before inputting the print data for the plurality of pages set in said step a) is finished.

15. A method according to claim 14, wherein the first process mode includes a copy mode or a facsimile communication mode.

16. An image synthesizing method comprising:

a reading step of reading an image in units of an original;

an input step of inputting print data from an external apparatus;

a first setting step of setting a synthesis mode for synthesizing image data output in said reading step and a different print data input in said input step for recordation;

a second setting step of setting a number of pages of different print data to be synthesized in the synthesis mode;

a synthesizing step of synthesizing the original image read in said reading step and the different print data of each page input in said input step; and a control step adapted, when the synthesis mode is set in said first setting step, to maintain the synthesis mode until inputting of the different print data of the number of pages set by said second setting step is complete, and to cancel the synthesis mode after the different print data of the set number of pages has been input.

17. An image synthesizing method according to claim 16, wherein said control step is adapted, after cancellation of the synthesis mode, to cause the print data, input in said input step, to be recorded in a normal print mode.

18. An image synthesizing method according to claim 16, wherein said control step is adapted, while the synthesis mode is set, to inhibit a function of said reading step other than for the synthesis mode, and to enable the function of said reading step after the synthesis mode is cancelled.

19. An image synthesizing method comprising:

a reading step of reading the image of an original;

an input step of inputting print data from an external apparatus;

a first setting step of setting a synthesis mode for synthesizing image data output in said reading step and the print data input in said input step for recordation;

A second setting step of setting a number of pages of the print data to be synthesized in the synthesis mode; and a control step adapted, when the synthesis mode is set in said first setting step, to cancel the synthesis mode in response to an absence of input of print data in said input step for a predetermined time, prior to a finish of the input of the print data of the number of pages set in said second setting step.

20. An image synthesizing method according to claim 19, wherein said control step is adapted, while the synthesis mode is set, to inhibit a function of said reading step other than for the synthesis mode, and to enable the function of said reading step after the synthesis mode is cancelled.

21. An image synthesizing method comprising:

a reading step of reading an image of an original;

an input step of inputting print data from an external apparatus;

a process step of processing image data output in said reading step and print data input in said input step;

a first setting step of setting a first process mode for processing the image data output in said reading step, without utilizing said input step;

a second setting step of setting a second process mode for synthesizing the image data output in said reading step and the print data input from the input step for recordation;

a designation step of designating a number of pages of the print data to be synthesized in the second process mode; and a control step adapted to inhibit the setting of the first process mode when the second process mode is set in said second setting step, and to cancel the second process mode and to enable the setting of the first process mode in response to an absence of input of the print data for a predetermined time prior to a finish of the input of the print data of the number of pages designated in said designation step.

22. An image synthesizing step according to claim 21, wherein the first process mode includes a copy mode or a facsimile transmission mode.

23. An image synthesizing steps according to claim 21, wherein said control step is adapted to cancel the second process mode and to enable setting of the first process mode, after a completion of the input of the print data of the number of pages designated in said designation step.

* * * * *

UNITED STATES PATENT AND TRADEMARK OFFICE
CERTIFICATE OF CORRECTION

PATENT NO. : 5,732,161
DATED : March 24, 1998
INVENTOR(S) : Ken Kuroda, et al.

It is certified that error appears in the above-identified patent and that said Letters Patent is hereby corrected as shown below:

<u>COLUMN 1</u>

Line 49, "recordations" should read --recordation,--.

<u>COLUMN 6</u>

Line 30, "command" should read --commands--.

<u>COLUMN 8</u>

Line 13, "identification" should read --an identification--.

<u>COLUMN 9</u>

Line 13, "the" should read --the thus--.

<u>COLUMN 14</u>

Line 15, "A" should read --a--.

Signed and Sealed this

Thirteenth Day of October 1998

*Attest:*

BRUCE LEHMAN

*Attesting Officer*      *Commissioner of Patents and Trademarks*